(12) United States Patent
Ishida et al.

(10) Patent No.: US 10,116,944 B2
(45) Date of Patent: Oct. 30, 2018

(54) VIDEO ENCODING DEVICE, VIDEO ENCODING METHOD, AND PROGRAM

(71) Applicant: NEC Corporation, Minato-ku, Tokyo (JP)

(72) Inventors: Takayuki Ishida, Tokyo (JP); Kensuke Shimofure, Tokyo (JP); Naoya Tsuji, Tokyo (JP); Suguru Nagayama, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 15/111,085

(22) PCT Filed: Jan. 29, 2015

(86) PCT No.: PCT/JP2015/000399
§ 371 (c)(1),
(2) Date: Jul. 12, 2016

(87) PCT Pub. No.: WO2015/118841
PCT Pub. Date: Aug. 13, 2015

(65) Prior Publication Data
US 2016/0345013 A1 Nov. 24, 2016

(30) Foreign Application Priority Data
Feb. 10, 2014 (JP) .................. 2014-023089

(51) Int. Cl.
*H04N 19/167* (2014.01)
*H04N 19/176* (2014.01)
(Continued)

(52) U.S. Cl.
CPC ......... *H04N 19/167* (2014.11); *H04N 19/176* (2014.11); *H04N 19/40* (2014.11); *H04N 19/436* (2014.11); *H04N 19/513* (2014.11)

(58) Field of Classification Search
CPC .... H04N 19/167; H04N 19/176; H04N 19/40; H04N 19/436; H04N 19/513
See application file for complete search history.

(56) References Cited

U.S. PATENT DOCUMENTS 5,978,029 A * 11/1999 Boice .................. H04N 19/176
375/240.14
2001/0026587 A1 10/2001 Hashimoto et al.
(Continued)

FOREIGN PATENT DOCUMENTS

JP H10-234043 A 9/1998
JP H11-122610 A 4/1999
(Continued)

OTHER PUBLICATIONS

Pereira et al., "Re-codable Video," IEEE International Conference on Image Processing, vol. 2, 1994.*
(Continued)

*Primary Examiner* — Thai Q Tran
*Assistant Examiner* — Christopher Braniff

(57) ABSTRACT

A video encoding device includes: first video encoding means for encoding an input image to generate first coded data; a buffer for storing the input image; coded data transcoding means for transcoding the first coded data generated by the first video encoding means, to generate second coded data; and second video encoding means for generating a prediction signal based on the second coded data supplied from the coded data transcoding means. The first video encoding means includes: dividing means for dividing the input image into a plurality of image areas; and at least one encoding means corresponding to the image areas each of which is made up of a plurality of blocks, and for performing encoding in units of blocks. The encoding means also encodes a block that is included in an image area (Continued)

adjacent with a dividing line in between and is located near the dividing line.

16 Claims, 32 Drawing Sheets

(51) Int. Cl.
    *H04N 19/40*     (2014.01)
    *H04N 19/436*     (2014.01)
    *H04N 19/513*     (2014.01)

(56) References Cited

U.S. PATENT DOCUMENTS

| | | |
|---|---|---|
| 2006/0274832 A1 | 12/2006 | Ducloux et al. |
| 2012/0275516 A1 | 11/2012 | Tanaka et al. |
| 2016/0301941 A1 | 10/2016 | Chono et al. |

FOREIGN PATENT DOCUMENTS

| | | |
|---|---|---|
| JP | 2001-285876 A | 10/2001 |
| JP | 2004-349756 A | 12/2004 |
| JP | 2006-517369 A | 7/2006 |
| JP | 2007-013864 A | 1/2007 |
| JP | 2009-055440 A | 3/2009 |
| JP | 2011-181980 A | 9/2011 |
| JP | 2012-104940 A | 5/2012 |
| WO | 2013/067311 A1 | 5/2013 |
| WO | 2015/033510 A1 | 3/2015 |

OTHER PUBLICATIONS

Doug Zhang et al., "Fast Transcoding From H.264/AVC to High Efficiency Video Coding", Multimedia and expo, 2012 IEEE International Conference on IEEE, Jul. 9, 2012, pp. 651-656.

Tong Shen et al., "Ultra Fast H.264/AVC to HEVC Transcoder" Data Compression Conference, 2013, IEEE, Mar. 20, 2013, pp. 241-250.

Chi Ching Chi et al., "Parallel Scalability and Efficiency of HEVC Parallelization Approaches", IEEE Transactions on circuits and Systems for Video Technology, Institute of Electrical and Electronics Engineers, vol. 22, No. 12 Dec. 1, 2012, pp. 1827-1838.

Henryk Richter et al. "Architectural decomposition of video decoders for many core architectuers", Design and Architectures for Signal and Image Processing, 2012 Conference on IEEE, Oct. 23, 2012, pp. 1-8.

Extended European Search Report for EP Application No. EP15745873.8 dated Aug. 8, 2017.

Japanese Office Action for JP Application No. 2015-561210 dated Jun. 20, 2017 with English Translation.

High Efficiency Video Coding (HEVC) text specification draft 10 (for FDIS & Last Call) of ITU-T SG16 WP3 and ISO/IEC JTC1/SC29/WG11 12th Meeting: Geneva, CH, Jan. 14-23, 2013.

High efficiency video coding (HEVC) text specification draft 7 of ITU-T SG16 WP3 and ISO/IEC JTC1/SC29/WG11 9th Meeting: Geneva, CH, Apr. 27-May 7, 2012.

ITUT H.264, Telecommunication Standardization Sector of ITU, Series H: Audiovisual and Multimedia Systems Infrastructure of audiovisual services—Coding of moving video, Advanced video coding for generic audiovisual, services, Jun. 2011.

International Search Report for PCT Application No. PCT/JP2015/000399, datedd Apr. 7, 2015.

Written opinion for PCT Application No. PCT/JP2015/000399.

* cited by examiner

```
typedef struct
{
  mb_type;
  sub_mb_type[4];
  ref_idx_l0[4];
  ref_idx_l1[4];
  mv_l0[4][4][2];
  mv_l1[4][4][2];
  intra_lumaNxN_pred[4][4];
  intra_chroma_pred;
  transform_size_8x8_flag;
} AVCMB
```

```
typedef struct
{
  cu_size[4];
  tu_size[4];
  pred_mode_flag[4];
  part_mode[4];
  ref_idx_l0[4];
  ref_idx_l1[4];
  mv_l0[4][4][2];
  mv_l1[4][4][2];
  intra_lumaNxN_pred[4][4];
  intra_chroma_pred[4];
} HEVCCB
```

FIG. 29

| AVC | | HEVC | | | | |
|---|---|---|---|---|---|---|
| mb_type | intra_lumaNxN_pred | cu_size | tu_size | pred_mode_flag | part_mode | intra_lumaNxN_pred |
| Intra_16x16 | V | 16 | 4 | 1 | 2Nx2N | INHERITANCE |
| Intra_16x16 | H | 16 | 4 | 1 | 2Nx2N | INHERITANCE |
| Intra_16x16 | DC | 16 | 4 | 1 | 2Nx2N | INHERITANCE |
| Intra_16x16 | Plane | 16 | 4 | 1 | 2Nx2N | Planar |
| Intra_8x8 | ALL PREDICTION DIRECTIONS ARE SAME IN MB | 16 | 8 | 1 | 2Nx2N | INHERITANCE |
| Intra_8x8 | OTHER | 8 | 8 | 1 | 2Nx2N | INHERITANCE |
| Intra_4x4 | ALL PREDICTION DIRECTIONS ARE SAME IN MB | 16 | 4 | 1 | 2Nx2N | INHERITANCE |
| Intra_4x4 | ALL PREDICTION DIRECTIONS ARE SAME IN 8x8 SUBBLOCK | 8 | 4 | 1 | 2Nx2N | INHERITANCE |
| Intra_4x4 | OTHER | 8 | 4 | 1 | NxN | INHERITANCE |

FIG. 30

| AVC | | | | | HEVC | | |
|---|---|---|---|---|---|---|---|
| mb_type | intra_lumaNxN_pred | cu_size | tu_size | | pred_mode_flag | part_mode | intra_lumaNxN_pred |
| P_Skip | NA | 16 | 4 << transform_size_8x8_flag | | 0 | 2Nx2N | NA |
| P_inter_16x16 | NA | 16 | 4 << transform_size_8x8_flag | | 0 | 2Nx2N | NA |
| P_inter_16x8 | NA | 16 | 4 << transform_size_8x8_flag | | 0 | 2NxN | NA |
| P_inter_8x16 | NA | 16 | 4 << transform_size_8x8_flag | | 0 | Nx2N | NA |
| P_8x8 | NA | 16 | 4 << transform_size_8x8_flag | | 0 | 2Nx2N | NA |
| Intra_16x16 | V | 16 | 4 | | 1 | 2Nx2N | INHERITANCE |
| Intra_16x16 | H | 16 | 4 | | 1 | 2Nx2N | INHERITANCE |
| Intra_16x16 | DC | 16 | 4 | | 1 | 2Nx2N | INHERITANCE |
| Intra_16x16 | Plane | 16 | 4 | | 1 | 2Nx2N | Planar |
| Intra_8x8 | ALL PREDICTION DIRECTIONS ARE SAME IN MB | 16 | 8 | | 1 | 2Nx2N | INHERITANCE |
| Intra_8x8 | OTHER | 8 | 8 | | 1 | 2Nx2N | INHERITANCE |
| Intra_4x4 | ALL PREDICTION DIRECTIONS ARE SAME IN MB | 16 | 4 | | 1 | 2Nx2N | INHERITANCE |
| Intra_4x4 | ALL PREDICTION DIRECTIONS ARE SAME IN 8x8 SUBBLOCK | 8 | 4 | | 1 | 2Nx2N | INHERITANCE |
| Intra_4x4 | OTHER | 8 | 4 | | 1 | NxN | INHERITANCE |

FIG. 31

| AVC | | | HEVC | | | | |
|---|---|---|---|---|---|---|---|
| mb_type | MV | intra_lumaNxN_pred | cu_size | tu_size | pred_mode_flag | part_mode | intra_lumaNxN_pred |
| B_Skip | ALL MOTION VECTORS ARE SAME IN MB | NA | 16x16 | 4 << transform_size_8x8_flag | 0 | 2Nx2N | NA |
| B_Skip | NOT ALL MOTION VECTORS ARE SAME IN MB | NA | 8x8 | 4 << transform_size_8x8_flag | 0 | 2Nx2N | NA |
| B_Direct_16x16 | ALL MOTION VECTORS ARE SAME IN MB | NA | 16x16 | 4 << transform_size_8x8_flag | 0 | 2Nx2N | NA |
| B_Direct_16x16 | NOT ALL MOTION VECTORS ARE SAME IN MB | NA | 8x8 | 4 << transform_size_8x8_flag | 0 | 2Nx2N | NA |
| B_inter_16x16 | NA | NA | 16x16 | 4 << transform_size_8x8_flag | 0 | 2Nx2N | NA |
| B_inter_16x8 | NA | NA | 16x16 | 4 << transform_size_8x8_flag | 0 | 2NxN | NA |
| B_inter_8x16 | NA | NA | 16x16 | 4 << transform_size_8x8_flag | 0 | Nx2N | NA |
| B_8x8 | NA | NA | 8x8 | 4 << transform_size_8x8_flag | 0 | 2Nx2N | NA |
| Intra_16x16 | NA | V | 16 | 4 | 1 | 2Nx2N | INHERITANCE |
| Intra_16x16 | NA | H | 16 | 4 | 1 | 2Nx2N | INHERITANCE |
| Intra_16x16 | NA | DC | 16 | 4 | 1 | 2Nx2N | INHERITANCE |
| Intra_16x16 | NA | Plane | 16 | 4 | 1 | 2Nx2N | Planar |
| Intra_8x8 | NA | ALL PREDICTION DIRECTIONS ARE SAME IN MB | 16 | 8 | 1 | 2Nx2N | INHERITANCE |
| Intra_8x8 | NA | OTHER | 8 | 8 | 1 | 2Nx2N | INHERITANCE |
| Intra_4x4 | NA | ALL PREDICTION DIRECTIONS ARE SAME IN MB | 16 | 8 | 1 | 2Nx2N | INHERITANCE |
| Intra_4x4 | NA | ALL PREDICTION DIRECTIONS ARE SAME IN 8x8 SUBBLOCK | 8 | 4 | 1 | 2Nx2N | INHERITANCE |
| Intra_4x4 | NA | OTHER | 8 | 4 | 1 | NxN | INHERITANCE |

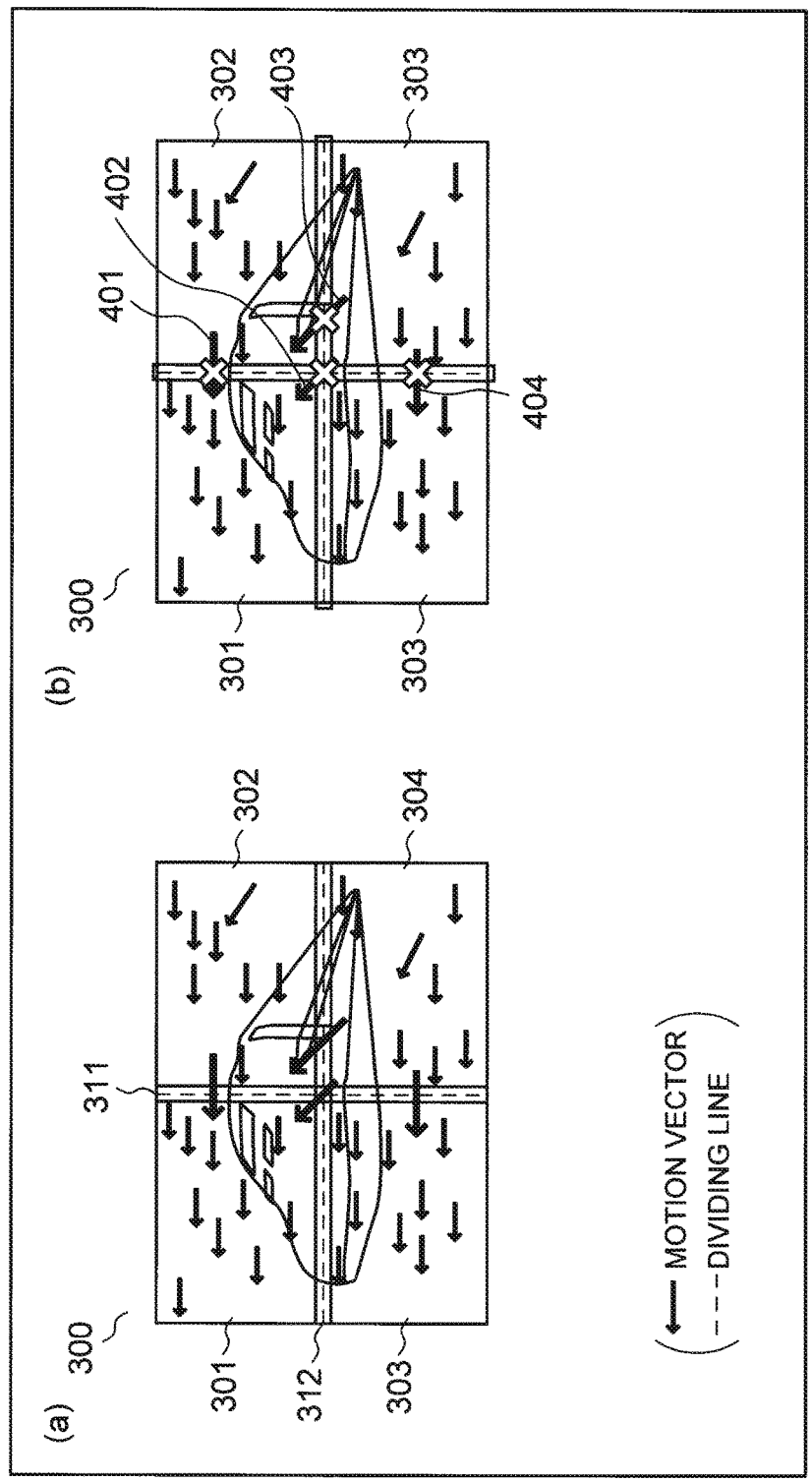

VIDEO ENCODING DEVICE, VIDEO ENCODING METHOD, AND PROGRAM

This application is a National Stage Entry of PCT/JP2015/000399 filed on Jan. 29, 2015, which claims priority from Japanese Patent Application 2014-023089 filed on Feb. 10, 2014, the contents of all of which are incorporated herein by reference, in their entirety.

FIELD OF THE INVENTION

The present invention relates to a video encoding device to which a technique of distributing the computational load of a video encoding process is applied.

BACKGROUND OF THE INVENTION

In the video coding scheme based on Non Patent Literature (NPL) 1, each frame of digitized video is split into coding tree units (CTUs), and each CTU is encoded in raster scan order. Each CTU is split into coding units (CUs) and encoded, in a quadtree structure. Each CU is split into prediction units (PUs) and predicted. The prediction error of each CU is split into transform units (TUs) and frequency-transformed, in a quadtree structure. Hereafter, a CU of the largest size is referred to as "largest CU" (largest coding unit: LCU), and a CU of the smallest size is referred to as "smallest CU" (smallest coding unit: SCU). The LCU size and the CTU size are the same.

Each CU is prediction-encoded by intra prediction or inter-frame prediction. The following describes intra prediction and inter-frame prediction.

Intra prediction is prediction for generating a prediction image from a reconstructed image of a frame to be encoded. NPL 1 defines 33 types of angular intra prediction depicted in FIG. 15. In angular intra prediction, a reconstructed pixel near a block to be encoded is used for extrapolation in any of 33 directions depicted in FIG. 15, to generate an intra prediction signal. In addition to 33 types of angular intra prediction, NPL 1 defines DC intra prediction for averaging reconstructed pixels near the block to be encoded, and planar intra prediction for linear interpolating reconstructed pixels near the block to be encoded. A CU encoded based on intra prediction is hereafter referred to as "intra CU".

Inter-frame prediction is prediction based on an image of a reconstructed frame (reference picture) different in display time from a frame to be encoded. Inter-frame prediction is hereafter also referred to as "inter prediction". FIG. 16 is an explanatory diagram depicting an example of inter-frame prediction. A motion vector MV=($mv_x$, $mv_y$) indicates the amount of translation of a reconstructed image block of a reference picture relative to a block to be encoded. In inter prediction, an inter prediction signal is generated based on a reconstructed image block of a reference picture (using pixel interpolation if necessary). A CU encoded based on inter-frame prediction is hereafter referred to as "inter CU".

Whether a CU is an intra CU or an inter CU is signaled by pred_mode_flag syntax described in NPL 1.

A frame encoded including only intra CUs is called "I frame" (or "I picture"). A frame encoded including not only intra CUs but also inter CUs is called "P frame" (or "P picture"). A frame encoded including inter CUs that each use not only one reference picture but two reference pictures simultaneously for the inter prediction of the block is called "B frame" (or "B picture").

The following describes the structure and operation of a typical video encoding device that receives each CU of each frame of digitized video as an input image and outputs a bitstream, with reference to FIG. 17.

A video encoding device depicted in FIG. 17 includes a transformer/quantizer 1021, an entropy encoder 1056, an inverse quantizer/inverse transformer 1022, a buffer 1023, a predictor 1024, and an estimator 1025.

FIG. 18 is an explanatory diagram depicting an example of CTU partitioning of a frame t and an example of CU partitioning of the eighth CTU (CTU8) included in the frame t, in the case where the spatial resolution of the frame is the common intermediate format (CIF) and the CTU size is 64. FIG. 19 is an explanatory diagram depicting a quadtree structure corresponding to the example of CU partitioning of CTU8. The quadtree structure, i.e. the CU partitioning shape, of each CTU is signaled by split_cu_flag syntax described in NPL 1.

FIG. 20 is an explanatory diagram depicting PU partitioning shapes of a CU. In the case where the CU is an intra CU, square PU partitioning is selectable. In the case where the CU is an inter CU, not only square but also rectangular PU partitioning is selectable. The PU partitioning shape of each CU is signaled by part_mode syntax described in NPL 1.

FIG. 21 is an explanatory diagram depicting examples of TU partitioning of a CU. An example of TU partitioning of an intra CU having a 2N×2N PU partitioning shape is depicted in the upper part of the drawing. In the case where the CU is an intra CU, the root of the quadtree is located in the PU, and the prediction error of each PU is expressed by the quadtree structure. An example of TU partitioning of an inter CU having a 2N×N PU partitioning shape is depicted in the lower part of the drawing. In the case where the CU is an inter CU, the root of the quadtree is located in the CU, and the prediction error of the CU is expressed by the quadtree structure. The quadtree structure of the prediction error, i.e. the TU partitioning shape of each CU, is signaled by split_tu_flag syntax described in NPL 1.

The estimator 1025 determines, for each CTU, a split_cu_flag syntax value for determining a CU partitioning shape that minimizes the coding cost. The estimator 1025 determines, for each CU, a pred_mode_flag syntax value for determining intra prediction/inter prediction, a part_mode syntax value for determining a PU partitioning shape, and a split_tu_flag syntax value for determining a TU partitioning shape that minimize the coding cost. The estimator 1025 determines, for each PU, an intra prediction direction, a motion vector, etc. that minimize the coding cost.

NPL 2 discloses a method of determining the split_cu_flag syntax value, the pred_mode_flag syntax value, the part_mode syntax value, the split_tu_flag syntax value, the intra prediction direction, the motion vector, etc. that minimize coding cost J based on a Lagrange multiplier λ.

The following briefly describes a decision process for the split_cu_flag syntax value, the pred_mode_flag syntax value, and the part_mode syntax value, with reference to the section 4.8.3 Intra/Inter/PCM mode decision in NPL 2.

The section discloses a CU mode decision process of determining the pred_mode_flag syntax value and the part_mode syntax value of a CU. The section also discloses a CU partitioning shape decision process of determining the split_cu_flag syntax value by recursively executing the CU mode decision process.

The CU mode decision process is described first. InterCandidate which is a set of PU partitioning shape candidates of inter prediction, IntraCandidate which is a set of PU partitioning shape candidates of intra prediction, and $J_{SSE}$ (mode) which is a sum of square error (SSE) coding cost for a coding mode (mode) are defined as follows.

InterCandidate={INTER_2N×2N, INTER_2N×N, INTER_N×2N, INTER_2N×N, INTER_N×2N, INTER_2N×nU, INTER_2N×nD, INTER_nL×2N, INTER_nR×2N, INTER_N×N}

IntraCandidate={INTRA_2N×2N, INTRA_N×N}

$J_{SSE}(\text{mode}) = D_{SSE}(\text{mode}) + \lambda_{mode} \cdot R_{mode}(\text{mode})$

[Math. 1]

$$\lambda_{mode} = 2^{\frac{QP-12}{3}}$$

Here, $D_{SSE}(\text{mode})$ denotes the SSE of the input image signal of the CU and the reconstructed image signal obtained in the encoding using mode, $R_{mode}(\text{mode})$ denotes the number of bits of the CU generated in the encoding using mode (including the number of bits of the below-mentioned transform quantization value), and QP denotes a quantization parameter.

In the CU mode decision process, bestPUmode which is the combination of pred_mode_flag syntax and part_mode syntax that minimize the SSE coding cost $J_{SSE}(\text{mode})$ is selected from InterCandidate and IntraCandidate. The CU mode decision process can be formulated as follows.

[Math. 2]

$$bestPUmode = \arg\min_{PUmode \in PUCandidate} \{J_{SSE}(PUmode)\}$$

PUCandidate={InterCandidate, IntraCandidate}

The CU partitioning shape decision process is described next.

The SSE coding cost of a CU (hereafter referred to as "node") at CUDepth is the SSE coding cost of bestPUmode of the node, as depicted in FIG. 19. The SSE coding cost $J_{SSE}(\text{node, CUDepth})$ of the node can thus be defined as follows.

[Math. 3]

$$J_{SSE}(\text{node, CUDepth}) = \min_{PUmode \in PUCandidate} \{J_{SSE}(PUmode)\}$$

The SSE coding cost of the i-th ($1 \leq i \leq 4$) child CU (hereafter referred to as "child node", "leaf", or the like) of the CU at CUDepth is the SSE coding cost of the i-th CU at CUDepth+1. The SSE coding cost $J_{SSE}(\text{leaf}(i), \text{CUDepth})$ of the i-th leaf can thus be defined as follows.

$J_{SSE}(\text{leaf}(i), \text{CUDepth}) = J_{SSE}(\text{node, CUDepth}+1)$

Whether or not to split the CU into four child CUs can be determined by comparing whether or not the SSE coding cost of the node is greater than the sum of the SSE coding costs of its leaves. In the case where $J_{SSE}(\text{node, CUDepth})$ is greater than the value of Expression (1) given below, the CU is split into four child CUs (split_cu_flag=1). In the case where $J_{SSE}(\text{node, CUDepth})$ is not greater than the value of Expression (1), the CU is not split into four child CUs (split_cu_flag=0).

[Math. 4]

$$\sum_{i=1}^{4} J_{SSE}(\text{leaf}(i), \text{CUDepth}) \quad (1)$$

In the CU quadtree structure decision process, the above-mentioned comparison is recursively executed for each CUDepth, to determine the quadtree structure of the CTU. In other words, split_cu_flag of each leaf is determined for each CUDepth.

The estimator 1025 equally determines split_tu_flag, the intra prediction direction, the motion vector, etc., by minimizing the coding cost J based on the Lagrange multiplier $\lambda$.

The predictor 1024 generates a prediction signal corresponding to the input image signal of each CU, based on the split_cu_flag syntax value, the pred_mode_flag syntax value, the part_mode syntax value, the split_tu_flag syntax value, the intra prediction direction, the motion vector, etc. determined by the estimator 1025. The prediction signal is generated based on the above-mentioned intra prediction or inter-frame prediction.

The transformer/quantizer 1021 frequency-transforms a prediction error image obtained by subtracting the prediction signal from the input image signal, based on the TU partitioning shape determined by the estimator 1025.

The transformer/quantizer 1021 further quantizes the frequency-transformed prediction error image (frequency transform coefficient). The quantized frequency transform coefficient is hereafter referred to as "transform quantization value".

The entropy encoder 1056 entropy-encodes the split_cu_flag syntax value, the pred_mode_flag syntax value, the part_mode syntax value, the split_tu_flag syntax value, the difference information of the intra prediction direction, and the difference information of the motion vector determined by the estimator 1025, and the transform quantization value.

The inverse quantizer/inverse transformer 1022 inverse-quantizes the transform quantization value. The inverse quantizer/inverse transformer 1022 further inverse-frequency-transforms the frequency transform coefficient obtained by the inverse quantization. The prediction signal is added to the reconstructed prediction error image obtained by the inverse frequency transform, and the result is supplied to the buffer 1023. The buffer 1023 stores the reconstructed image.

The typical video encoding device generates a bitstream based on the operation described above.

In the video encoding device depicted in FIG. 17, the load of all of the video encoding process for determining the split_cu_flag syntax value, the pred_mode_flag syntax value, the part_mode syntax value, the split_tu_flag syntax value, the intra prediction direction, the motion vector, etc. is concentrated at the specific estimator.

CITATION LIST

Patent Literatures

PTL 1: Japanese Patent Application Publication No. 2012-104940
PTL 2: Japanese Patent Application Publication No. 2001-285876
PTL 3: Japanese Patent Application Publication No. 2011-181980

Non Patent Literatures

NPL 1: High Efficiency Video Coding (HEVC) text specification draft 10 (for FDIS & Last Call) of ITU-T SG16 WP3 and ISO/IEC JTC1/SC29/WG11 12th Meeting: Geneva, CH, 14-23 Jan. 2013

NPL 2: High efficiency video coding (HEVC) text specification draft 7 of ITU-T SG16 WP3 and ISO/IEC JTC1/SC29/WG11 12th Meeting: Geneva, CH, 27 Apr.-7 May 2012

NPL 3: ITU-T H.264 2011/06

SUMMARY OF THE INVENTION

Some of the inventors of the present invention proposed a video encoding device capable of distributing the processing load (Japanese Patent Application No. 2013-185994).

Patent Literature (PTL) 1 describes a video encoding device including a first encoding part and a second encoding part. However, PTL 1 does not disclose a technique for distributing the load in the video encoding device. PTL 2 and PTL 3 each describe a video encoding device that divides one screen, inputs each divided screen (each of a plurality of screens obtained by division) to a corresponding encoder, and integrates bitstreams generated by the respective encoders. An encoder described in PTL 2 encodes macroblocks near a dividing line as intra blocks, and reduces the number of intra blocks as the distance from the dividing line increases. An encoder described in PTL 3 reconstructs images of a non-overlapping area and an overlapping area on the decoding side. Neither PTL 2 nor PTL 3, however, discloses a technique for distributing the load in the video encoding device.

FIG. 22 is a block diagram depicting an example of a video encoding device capable of distributing the processing load. In the video encoding device depicted in FIG. 22, a first video encoder 102 is an Advanced Video Coding (AVC) video encoder that supports macroblocks equivalent to CTUs of 16×16 pixel LCU size. The first video encoder 102 is a video encoder based on the H.264/AVC standard described in NPL 3. A second video encoder 105 is an HEVC video encoder that supports not only 16×16 pixel CTUs but also 32×32 pixel CTUs and 64×64 pixel CTUs. The second video encoder 105 is a video encoder based on the H.265/HEVC standard. In other words, the largest LCU size that can be supported by the first video encoder 102 is less than or equal to the largest LCU size that can be supported by the second video encoder 105.

The video encoding device depicted in FIG. 22 includes a size extender 101, the first video encoder 102, a buffer 103, a coded data transcoder 104, and the second video encoder 105.

The size extender 101 size-extends the width src_pic_width and height src_pic_height of an input image src to a multiple of 16. For example, in the case where (src_pic_width, src_pic_height)=(1920, 1080), the extended width e_src_pic_width and height e_src_pic_height of the input image are (e_src_pic_width, e_src_pic_height)=(1920, 1088). A pixel value in a size-extended area may be a copy of a pixel value of a boundary of the input image or a predetermined pixel value (e.g. 128 representing gray).

The size extender 101 supplies the size-extended input image to the first video encoder 102 and the buffer 103. The first video encoder 102 encodes the size-extended input image according to AVC.

The following describes the structure and operation of the first video encoder 102.

The first video encoder 102 includes a transformer/quantizer 1021, an inverse quantizer/inverse transformer 1022, a buffer 1023, a predictor 1024, and an estimator (first estimator) 1025.

The estimator 1025 determines AVC coded data of each macroblock constituting the size-extended input image, using the size-extended input image and a reconstructed image stored in the buffer 1023. In this specification, AVC coded data (AVCMB) includes coded data (mb_type, sub_mb_type, ref_idx_l0, ref_idx_l1, mv_l0, mv_l1, intra_lumaN×N_pred, transform_size_8×8_flag) other than a DCT coefficient of a 16×16 pixel area corresponding to a macroblock, as depicted in FIG. 23. Here, mb_type and sub_mb_type respectively indicate a coding mode of a macroblock defined in Table 7-11, Table 7-13, and Table 7-14 in NPL 3 and a coding mode of a sub-macroblock defined in Table 7-17 and Table 7-18 in NPL 3. Moreover, ref_idx_lx (x=0/1), mv_lx, intra_lumaN×N_pred, and transform_size_8×8 flag respectively indicate a reference picture index of a reference picture list x, a motion vector of the reference picture list x, a luminance intra prediction direction, and a flag of whether or not the macroblock is encoded using 8×8 DCT.

Given that the macroblock is 16×16 pixels as mentioned above and the smallest processing unit in AVC is 4×4 pixels, the position of each piece of AVC coded data in each macroblock is defined by a combination of a 16×16 block address b8 ($0 \leq b8 \leq 3$) in the macroblock (the upper part in FIG. 24) and a block address b4 ($0 \leq b4 \leq 3$) in the 8×8 block (the lower part in FIG. 24). For example, intra_lumaN×N_pred at the position (x, y)=(4, 4) in the macroblock corresponds to (b8, b4)=(0, 1), and can be stored in intra_lumaN×N_pred[0][3].

The estimator 1025 outputs the determined AVC coded data of each macroblock to the predictor 1024 and the coded data transcoder 104.

The predictor 1024 generates a prediction signal corresponding to the size-extended input image signal of each macroblock, based on the mb_type syntax value, the sub_mb_type syntax value, the ref_idx_l0 syntax value, the ref_idx_l1 syntax value, the mv_l0 syntax value, the mv_l1 syntax value, and the intra_lumaN×N_pred syntax value determined by the estimator 1025. The prediction signal is generated based on the above-mentioned intra prediction or inter-frame prediction.

Regarding intra prediction in AVC, intra prediction modes of three block sizes, i.e. Intra_4×4, Intra_8×8, and Intra 16×16, defined by mb_type are available, as described in NPL 3.

Intra_4×4 and Intra_8×8 are respectively intra prediction of 4×4 block size and 8×8 block size, as can be understood from (a) and (c) in FIG. 25. Each circle (○) in the drawing represents a reference pixel for intra prediction, i.e. the reconstructed image stored in the buffer 1023.

In intra prediction of Intra_4×4, peripheral pixels of the reconstructed image are directly set as reference pixels, and used for padding (extrapolation) in nine directions depicted in (b) in FIG. 25 to form the prediction signal. In intra prediction of Intra_8×8, pixels obtained by smoothing peripheral pixels of the reconstructed image by low-pass filters (½, ¼, ½) depicted directly below the right arrow in (c) in FIG. 25 are set as reference signals, and used for extrapolation in the nine directions depicted in (b) in FIG. 25 to form the prediction signal.

Intra_16×16 is intra prediction of 16×16 block size, as can be understood from (a) in FIG. 26. Each circle (○) in FIG. 26 represents a reference pixel for intra prediction, i.e. the reconstructed image stored in the buffer 1023, as in the example depicted in FIG. 25. In intra prediction of Intra_16×16, peripheral pixels of the reconstructed image are directly set as reference pixels, and used for extrapolation in four directions depicted in (b) in FIG. 26 to form the prediction signal.

Regarding inter-frame prediction in AVC, 16×16, 16×8, 8×16, and Tree prediction shapes defined by mb_type are available, as depicted in FIG. 27. In the case where the macroblock is Tree, each 8×8 sub-macroblock has a prediction shape of any of 8×8, 8×4, 4×8, and 4×4 defined by sub_mb_type. It is assumed in this specification that, in the case where mb_type is Tree (P_8×8 or B_8×8), each 8×8 sub-macroblock is limited only to 8×8, for simplicity's sake.

The transformer/quantizer 1021 frequency-transforms a prediction error image obtained by subtracting the prediction signal from the size-extended input image signal, based on the mb_type syntax value and the transform_size_8×8 flag syntax value determined by the estimator 1025.

The transformer/quantizer 1021 further quantizes the frequency-transformed prediction error image (frequency transform coefficient). The quantized frequency transform coefficient is hereafter referred to as "transform quantization value".

The inverse quantizer/inverse transformer 1022 inverse-quantizes the transform quantization value. The inverse quantizer/inverse transformer 1022 further inverse-frequency-transforms the frequency transform coefficient obtained by the inverse quantization. The prediction signal is added to the reconstructed prediction error image obtained by the inverse frequency transform, and the result is supplied to the buffer 1023. The buffer 1023 stores the reconstructed image.

Based on the operation described above, the first video encoder 102 encodes the size-extended input image signal.

The coded data transcoder 104 transcodes the AVCMB of each macroblock to an HEVCCB which is HEVC coded data (cu_size, tu_size, pred_mode_flag, part_mode, ref_idx_l0, ref_idx_l1, mv_l0, mv_l1, intra_lumaN×N_pred, intra chroma pred) of a 16×16 pixel area corresponding to the macroblock, as depicted in FIG. 28. Here, cu_size and tu_size respectively indicate CU size and TU size.

FIG. 29 is an explanatory diagram depicting rules for transcoding from AVC coded data of macroblocks of I_SLICE to HEVCCBs. FIG. 30 is an explanatory diagram depicting rules for transcoding from AVC coded data of macroblocks of P_SLICE to HEVCCBs. FIG. 31 is an explanatory diagram depicting rules for transcoding from AVC coded data of macroblocks of B_SLICE to HEVCCBs. In FIGS. 29 to 31, V demotes the vertical direction, and H denotes the horizontal direction. Each row indicates a transcoding rule for the corresponding mb_type and intra_lumaN×N_pred.

Given that the smallest LCU size is 16×16 pixels, the smallest SCU size is 8×8 pixels, and the smallest processing unit is 4×4 pixels in HEVC, HEVC coded data can be managed in units of 16×16 pixels. The position of HEVC coded data in 16×16 pixels can be defined by a combination of a 8×8 block address b8 (0≤b8≤3) in the macroblock and a block address b4 (0≤b4≤3) in the 8×8 block, as with AVC coded data.

For example, in the case where the CU size is 16, cu_size[b8] (0≤b8≤3) of HEVC coded data in 16×16 pixels are all 16.

I_SLICE mapping depicted in FIG. 29, P_SLICE mapping depicted in FIG. 30, and B_SLICE mapping depicted in FIG. 31 each indicate rules for mapping (transcoding) AVC-MBs to HEVCCBs by the coded data transcoder 104, depending on picture type.

Next, in the case where part_mode of all adjacent four HEVCCBs depicted in FIG. 32 are 2N×2N and all of the HEVCCBs have the same cu_size, pred_mode_flag, and motion information (ref_idx_l0, ref_idx_l1, mv_l0, and mv_l1), the coded data transcoder 104 merges the four HEVCCBs. In detail, the coded data transcoder 104 updates cu_size of the four HEVCCBs to 32.

Further, in the case where part_mode of all adjacent 16 HEVCCBs depicted in FIG. 33 are 2N×2N and all of the HEVCCBs have the same cu_size, pred_mode_flag, and motion information (ref_idx_l0, ref_idx_l1, mv_l0, and mv_l1), the coded data transcoder 104 merges the 16 HEVCCBs. In detail, the coded data transcoder 104 updates cu_size of the 16 HEVCCBs to 64.

The second video encoder 105 encodes, according to HEVC, the size-extended input image supplied from the buffer 103 based on the HEVC coded data supplied from the coded data transcoder 104, and outputs a bitstream. The second video encoder 105 sets the input image src not to a multiple of the SCU but to a multiple of the macroblock size of the first video encoder 102, in order to enhance the reliability of the coded data of the first video encoder 102 for image boundaries.

The following describes the structure and operation of the second video encoder 105.

The second video encoder 105 includes a transformer/quantizer 1051, an inverse quantizer/inverse transformer 1052, a buffer 1053, a predictor 1054, an estimator (second estimator) 1055, and an entropy encoder 1056.

The estimator 1055 in the second video encoder 105 can determine split_cu_flag for each CTU, according to cu_size of the HEVC coded data. For example, in the case where cu_size=64, split_cu_flag at CUDepth=0 is set to 0. Likewise, the estimator 1055 can determine the intra prediction/inter prediction and PU partitioning shape of each CU, according to pred_mode_flag and part_mode of the HEVC coded data. The estimator 1055 can also determine the intra prediction direction, motion vector, etc. of each PU, according to pred_mode_flag and part_mode of the HEVC coded data. Thus, the estimator 1055 does not need to exhaustively search for the coding parameters that minimize the coding cost J based on the Lagrange multiplier λ, unlike the estimator in the background art.

The predictor 1054 generates a prediction signal corresponding to the input image signal of each CU, based on the split_cu_flag syntax value, the pred_mode_flag syntax value, the part_mode syntax value, the split_tu_flag syntax value, the intra prediction direction, the motion vector, etc. determined by the estimator 1055. The prediction signal is generated based on the above-mentioned intra prediction or inter-frame prediction.

The transformer/quantizer 1051 frequency-transforms a prediction error image obtained by subtracting the prediction signal from the input image signal, based on the TU partitioning shape determined by the estimator 1055 according to tu_size of the HEVC coded data.

The transformer/quantizer 1051 further quantizes the frequency-transformed prediction error image (frequency transform coefficient).

The entropy encoder 1056 entropy-encodes the split_cu_flag syntax value, the pred_mode_flag syntax value, the part_mode syntax value, the split_tu_flag syntax value, the difference information of the intra prediction direction, and the difference information of the motion vector determined by the estimator 1055, and the transform quantization value.

The inverse quantizer/inverse transformer 1052 inverse-quantizes the transform quantization value. The inverse quantizer/inverse transformer 1052 further inverse-frequency-transforms the frequency transform coefficient obtained by the inverse quantization. The prediction signal is added to the reconstructed prediction error image obtained by the inverse frequency transform, and the result is supplied to the buffer 1053. The buffer 1053 stores the reconstructed image.

Based on the operation described above, the second video encoder 105 encodes, according to HEVC, the size-extended input image supplied from the buffer 103 based on the HEVC coded data supplied from the coded data transcoder 104, and outputs a bitstream.

The following describes the operation of the video encoding device with reference to a flowchart in FIG. 34.

In step S101, the size extender 101 size-extends the input image to a multiple of 16 which is the macroblock size of the first video encoder 102.

In step S102, the first video encoder 102 encodes the size-extended input image according to AVC.

In step S104, the coded data transcoder 104 transcodes the AVCMB of each macroblock of the size-extended input image to the HEVCCB, and further merges HEVCCBs.

In step S105, the second video encoder 105 encodes, according to HEVC, the size-extended input image supplied from the buffer 103 based on the HEVC coded data supplied from the coded data transcoder 104, and outputs a bitstream.

In the video encoding device described above, the load of the video encoding process for determining the split_cu_flag syntax value, the pred_mode_flag syntax value, the part_mode syntax value, the split_tu_flag syntax value, the intra prediction direction, the motion vector, etc. is distributed between the first video encoder 102 and the second video encoder 105, thus reducing the concentration of the load of the video encoding process.

In the case where adjacent four HEVCCBs satisfy all of the following 32×32 2N×N conditions, the coded data transcoder 104 may update cu_size and part_mode of the four HEVCCBs respectively to 32 and 2N×N.

[32×32 2N×N conditions]
part_mode of all HEVCCBs are 2N×2N.
cu_size of all HEVCCBs are the same.
pred_mode_flag of all HEVCCBs are 0.
The motion information of all HEVCCBs are not the same.
The motion information of upper two HEVCCBs are the same.
The motion information of lower two HEVCCBs are the same.

In the case where adjacent four HEVCCBs satisfy all of the following 32×32 N×2N conditions, the coded data transcoder 104 may update cu_size and part_mode of the four HEVCCBs respectively to 32 and N×2N.

[32×32 N×2N conditions]
part_mode of all HEVCCBs are 2N×2N.
cu_size of all HEVCCBs are the same.
pred_mode_flag of all HEVCCBs are 0.
The motion information of all HEVCCBs are not the same.
The motion information of left two HEVCCBs are the same.
The motion information of right two HEVCCBs are the same.

Further, in the case where adjacent 16 HEVCCBs satisfy all of the following 64×64 2N×N conditions, the coded data transcoder 104 may update cu_size and part_mode of the 16 HEVCCBs respectively to 64 and 2N×N.

[64×64 2N×N conditions]
part_mode of all HEVCCBs are 2N×2N.
cu_size of all HEVCCBs are the same.
pred_mode_flag of all HEVCCBs are 0.
The motion information of all HEVCCBs are not the same.
The motion information of upper eight HEVCCBs are the same.
The motion information of lower eight HEVCCBs are the same.

In the case where adjacent 16 HEVCCBs satisfy all of the following 64×64 N×2N conditions, the coded data transcoder 104 may update cu_size and part_mode of the 16 HEVCCBs respectively to 64 and N×2N.

[64×64 N×2N conditions]
part_mode of all HEVCCBs are 2N×2N.
cu_size of all HEVCCBs are the same.
pred_mode_flag of all HEVCCBs are 0.
The motion information of all HEVCCBs are not the same.
The motion information of left eight HEVCCBs are the same.
The motion information of right eight HEVCCBs are the same.

Though the input image is encoded using a combination of one first video encoding means and one second video encoding means in the video encoding device depicted in FIG. 22, the present invention is applicable to, for example, a video encoding device that divides the input image into four screens as depicted in FIG. 35 and processes the four divided screens in parallel using four first video encoders and four second video encoders.

FIG. 36 is a block diagram depicting a structural example of a video encoding device for processing divided screens in parallel. The video encoding device depicted in FIG. 36 includes: a screen divider 1081 for dividing an input image into four screens; first video encoders 102A, 102B, 102C, and 102D for encoding the respective divided screens; a buffer 103; a coded data transcoder 104; a screen divider 1082 for dividing an input image supplied from the buffer 103 into four screens; second video encoders 105A, 105B, 105C, and 105D for encoding the respective divided screens; and a multiplexer 109 for multiplexing coded data from the second video encoders 105A, 105B, 105C, and 105D and outputting a bitstream.

The functions of the first video encoders 102A, 102B, 102C, and 102D are the same as the function of the first video encoder 102 depicted in FIG. 22. The functions of the second video encoders 105A, 105B, 105C, and 105D are the same as the function of the second video encoder 105 depicted in FIG. 22.

The functions of the buffer 103 and the coded data transcoder 104 are the same as the functions in the video encoding device depicted in FIG. 22. In the video encoding device depicted in FIG. 36, however, the coded data transcoder 104 respectively transcodes coded data output from the four first video encoders 102A, 102B, 102C, and 102D and supplies the transcoded data to the second video encoders 105A, 105B, 105C, and 105D.

A video encoding device for dividing an input image into a plurality of screens and processing the plurality of divided screens in parallel using a plurality of first video encoders and a plurality of second video encoders is particularly effective in the case of encoding a high definition image having high resolution. For example, the plurality of first video encoders and the plurality of second video encoders are used in the case where it is difficult to execute an encoding process within a required processing time using only one video encoder.

In the case of using the plurality of first video encoders and the plurality of second video encoders, however, there is a possibility that the image quality decreases in a dividing line and the dividing line becomes visible.

FIG. 37 is an explanatory diagram for describing the reason why the image quality decreases in a dividing line. Suppose one screen 300 is divided by four, and four divided screens 301, 302, 303, and 304 are encoded in respective cores (cores C1, C2, C3, and C4), as depicted in (a) in FIG. 37. In detail, the core C1 is to encode the divided screen 301, the core C2 is to encode the divided screen 302, the core C3 is to encode the divided screen 303, and the core C4 is to encode the divided screen 304. The cores C1, C2, C3, and C4 correspond to the first video encoders 102A, 102B, 102C, and 102D depicted in FIG. 36. Also suppose an object 310 is moving from right to left in the pre-division screen 300.

Consider the case where the cores C1, C2, C3, and C4 perform inter prediction. When the object 310 is moving across a dividing line 311 or 312 (see the dashed lines in (a) in FIG. 37), for example, accurate motion vectors cannot be obtained for macroblocks on the left side of the dividing line 311 unless images on the right side of the dividing line 311 are referenced to. In FIG. 37, the arrows represent motion vectors.

The cores C1, C2, C3, and C4 perform encoding respectively for the divided screens 301, 302, 303, and 304, and so cannot generate motion vectors extending across the dividing line 311 or 312. This causes a decrease in image quality in the part corresponding to the dividing line 311 or 312 between adjacent two divided screens. For example, there is a possibility that such a dividing line is visible in an image obtained by decoding a bitstream deriving from the encoded image. In (b) in FIG. 37, the respective cross marks indicate that motion vectors 401 to 404 extend across the dividing line 311 or 312.

In the video encoding device depicted in FIG. 36, while AVC coded data (AVCMB) is transcoded to HEVC coded data (HEVCCB), the information of the AVCMB including motion vector information is transmitted to the first video encoders 102A, 102B, 102C, and 102D, and so the output data of the first video encoders 102A, 102B, 102C, and 102D may also have lower image quality in the dividing line between the divided screens.

The present invention has an object of providing a video encoding device, a video encoding method, and a program for preventing a decrease in image quality in a dividing line between divided screens, while distributing the processing load.

A video encoding device according to the present invention includes: first video encoding means for encoding an input image to generate first coded data; coded data transcoding means for transcoding the first coded data generated by the first video encoding means, to generate second coded data; and second video encoding means for generating a prediction signal based on the second coded data supplied from the coded data transcoding means, wherein the first video encoding means includes: dividing means for dividing the input image into a plurality of image areas; and at least one encoding means corresponding to the image areas each of which is made up of a plurality of blocks, and for performing encoding in units of blocks, and wherein the encoding means also encodes a block that is included in an image area adjacent with a dividing line in between and is located near the dividing line.

A video encoding method according to the present invention includes: encoding an input image to generate first coded data; transcoding the first coded data to generate second coded data; and generating a prediction signal based on the second coded data, wherein when generating the first coded data, the input image is divided into a plurality of image areas, and an encoding process is performed in units of blocks for each of the image areas each of which is made up of a plurality of blocks, and wherein when performing the encoding process for each of the image areas, a block that is included in an image area adjacent with a dividing line in between and is located near the dividing line is also encoded.

A video encoding program according to the present invention causes a computer to execute: a process of encoding an input image to generate first coded data; a process of transcoding the first coded data to generate second coded data; and a process of generating a prediction signal based on the second coded data, wherein when generating the first coded data, the video encoding program causes the computer to execute: a process of dividing the input image into a plurality of image areas; and an encoding process of performing encoding in units of blocks, for each of the image areas each of which is made up of a plurality of blocks, and wherein when performing the encoding process for each of the image areas, the video encoding program causes the computer to execute a process of also encoding a block that is included in an image area adjacent with a dividing line in between and is located near the dividing line.

According to the present invention, the computational load of the video encoding process is distributed between the first video encoding means and the second video encoding means, so that the concentration of the load can be avoided. Moreover, a decrease in image quality in a dividing line between divided screens can be prevented.

BRIEF DESCRIPTION OF THE DRAWINGS

FIG. 29 It is an explanatory diagram depicting rules for transcoding from AVC coded data of macroblocks of I_SLICE to HEVCCBs.

FIG. 30 It is an explanatory diagram depicting rules for transcoding from AVC coded data of macroblocks of P_SLICE to HEVCCBs.

FIG. 31 It is an explanatory diagram depicting rules for transcoding from AVC coded data of macroblocks of B_SLICE to HEVCCBs.

FIG. 37 It is an explanatory diagram for describing the reason of a decrease in image quality in dividing lines.

DESCRIPTION OF THE PREFERRED EMBODIMENTS

The following describes an exemplary embodiment of the present invention with reference to drawings.

Figure 1:
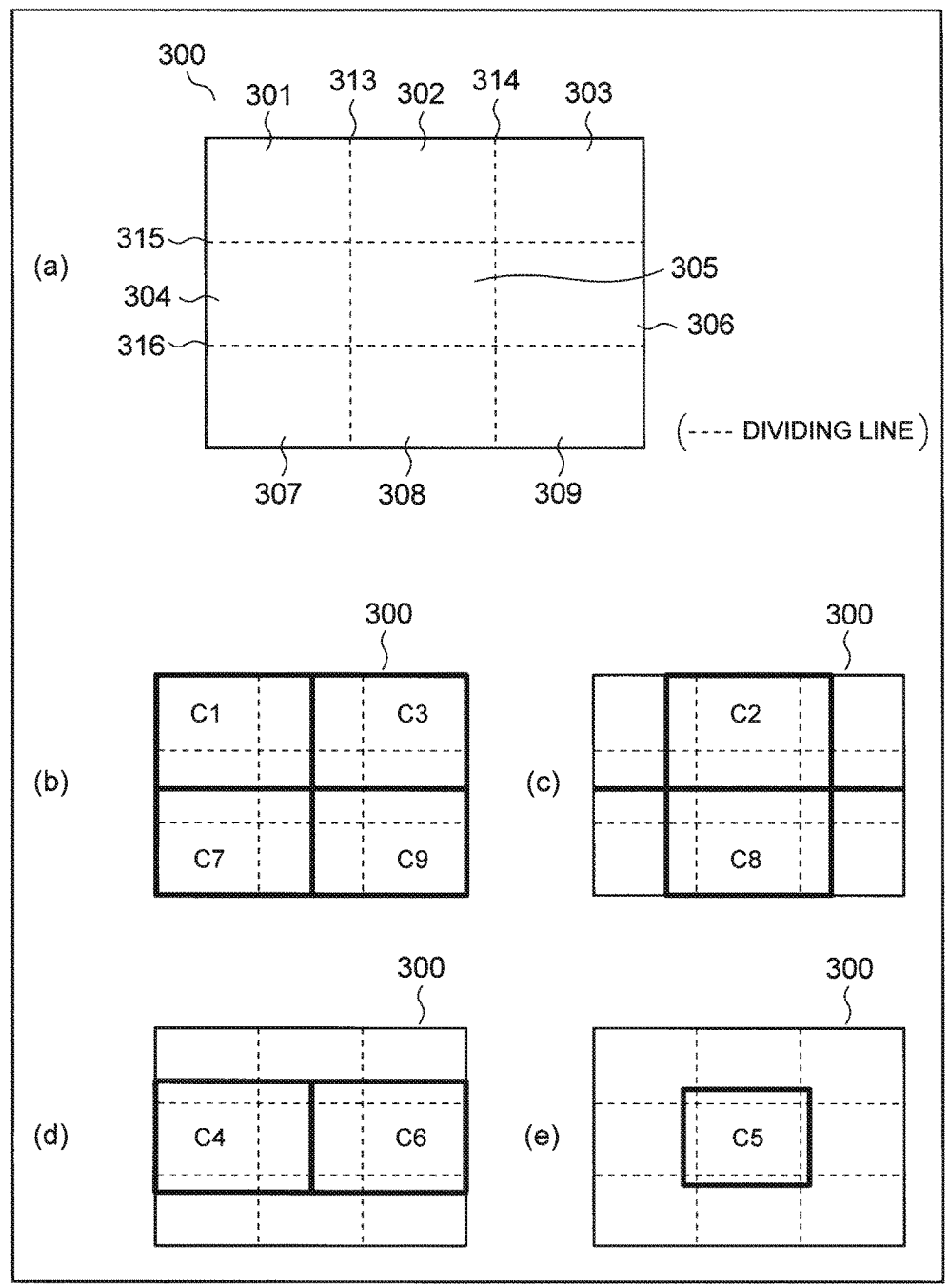
FIG. 1 It is an explanatory diagram for describing an example of a process of a video encoding device in an exemplary embodiment.

FIG. 1 is an explanatory diagram for describing an example of a process of a video encoding device in an exemplary embodiment of the present invention. (a) in FIG. 1 depicts an example of screen division. In the example depicted in (a) in FIG. 1, one screen 300 is divided into 3×3 (=9) equal-sized divided screens 301 to 309.

Figure 36:
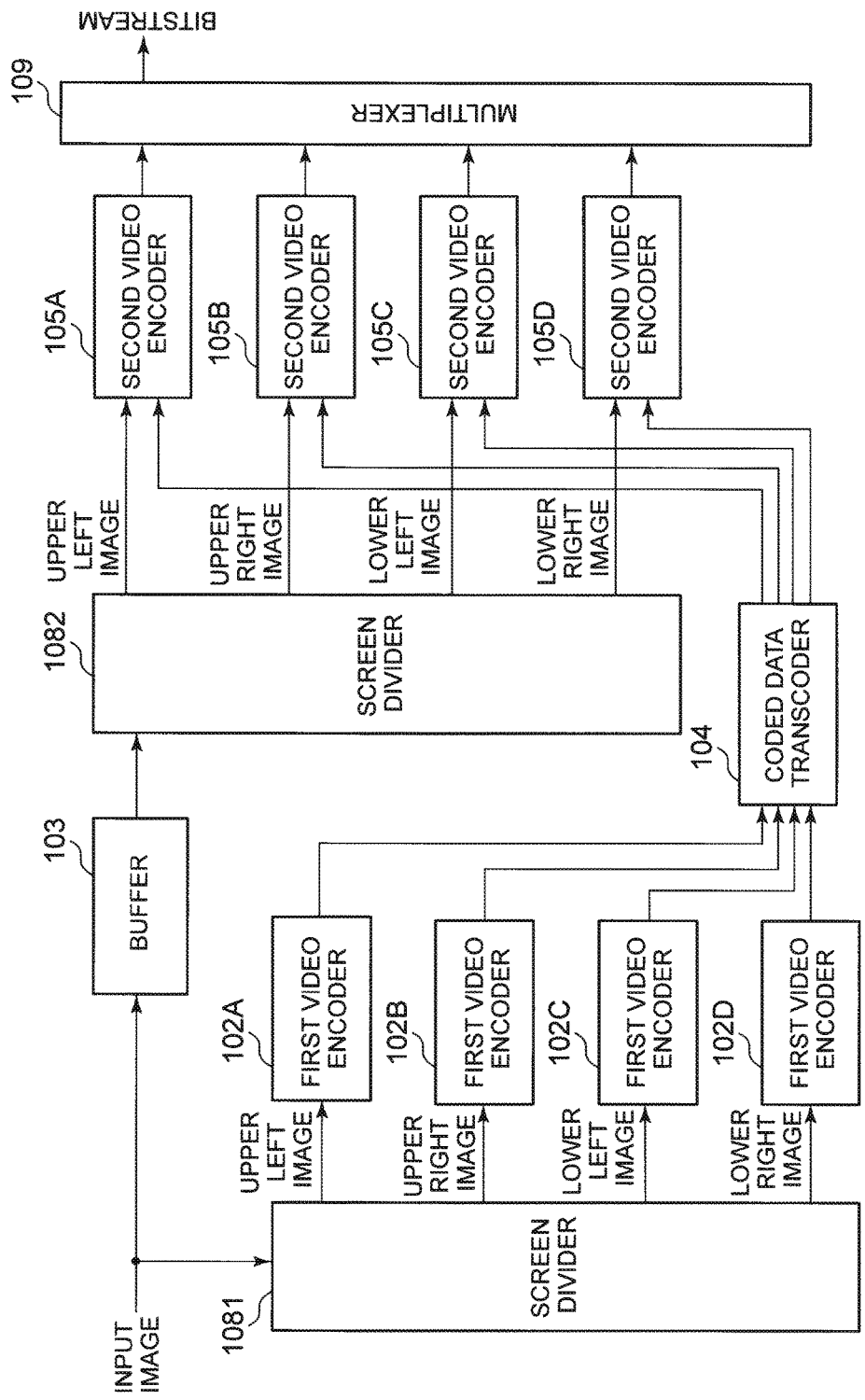
FIG. 36 It is a block diagram depicting a video encoding device for processing divided screens in parallel.

(b) to (e) in FIG. 1 are explanatory diagrams for describing areas to be encoded by cores C1 to C9. The structure of the video encoding device in this exemplary embodiment is the same as the structure depicted in FIG. 36. The cores C1 to C9 correspond to the first video encoders depicted in FIG. 36. Though FIG. 36 depicts four first video encoders 102A, 102B, 102C, and 102D, FIG. 1 depicts an example of using nine cores C1 to C9.

Figure 35:
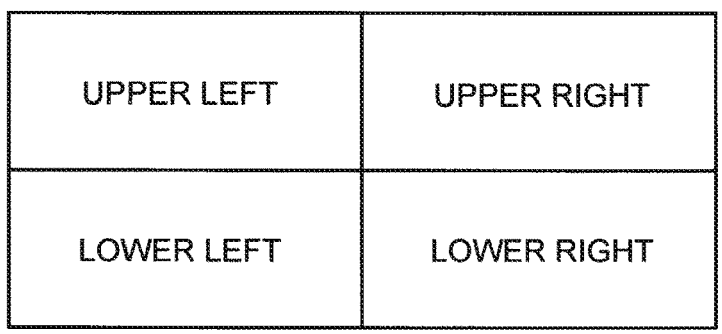
FIG. 35 It is an explanatory diagram depicting an example of screen division.

As depicted in (b) to (e) in FIG. 1, the cores C1, C3, C7, and C9 respectively perform an encoding process for upper left, upper right, lower left, and lower right (see FIG. 35) areas. The cores C2 and C8 respectively perform an encoding process for center upper and center lower areas. The cores C4 and C6 respectively perform an encoding process for center left and center right areas. The core C5 performs an encoding process for a center area. FIG. 1 is a diagram for describing overlapping parts of the respective areas of the cores C1 to C9. The concept of area division is depicted in FIG. 1.

As depicted in FIG. 1, nearby parts of dividing lines 313, 314, 315, and 316 are subjected to encoding by a plurality of cores.

Figure 2:
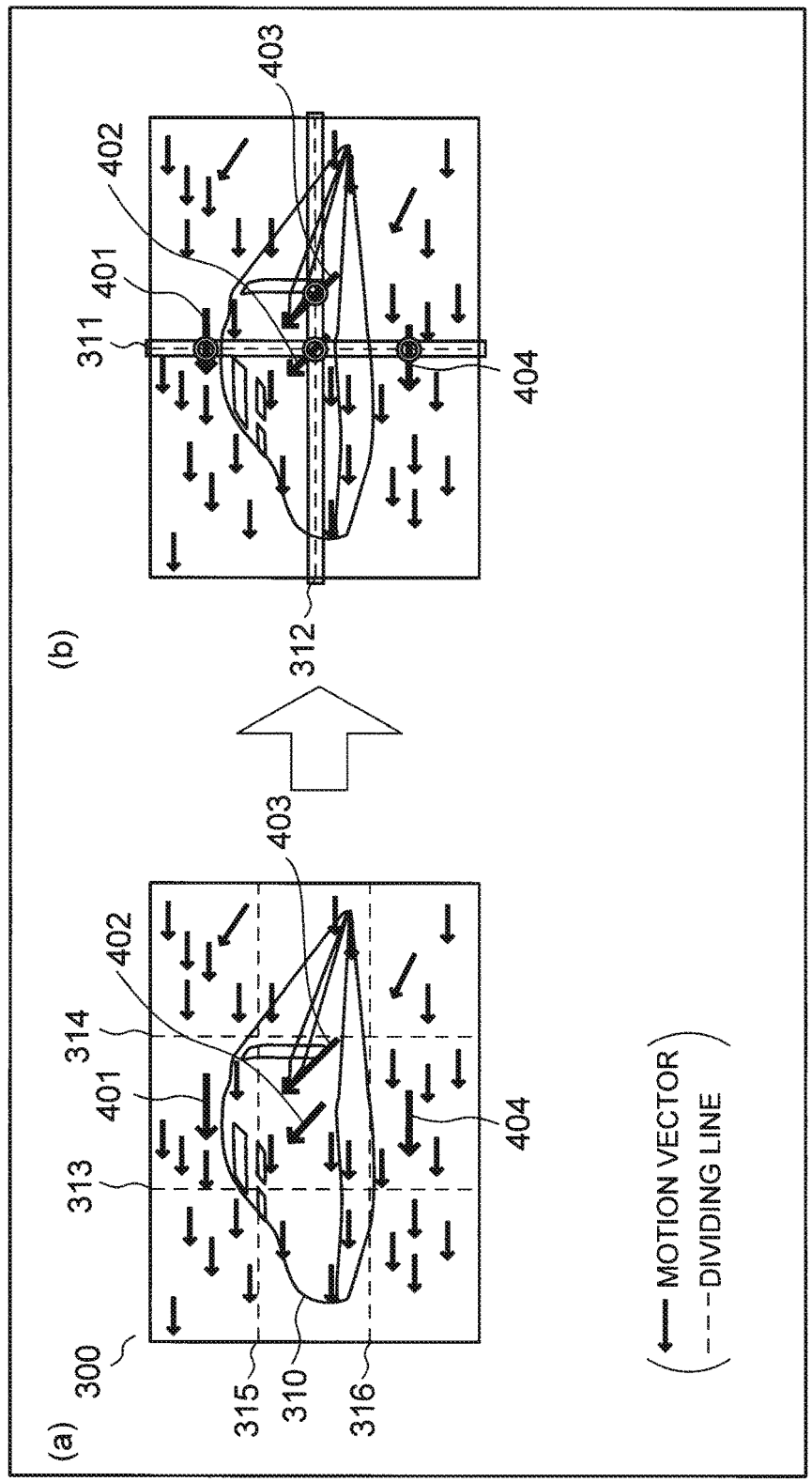
FIG. 2 It is an explanatory diagram for describing the effects of the video encoding device in the exemplary embodiment.

FIG. 2 is an explanatory diagram for describing the effects of the video encoding device in this exemplary embodiment. In FIG. 2, each arrow represents an example of a motion vector based on the movement of the object 310. Since the nearby parts of the dividing lines 313, 314, 315, and 316 are subjected to encoding by a plurality of cores as depicted in FIG. 1, in the case where one screen is divided by four in the subsequent screen divider 1082 (see FIG. 36), motion vectors extending across the dividing line 311 or 312 are generated as depicted in (b) in FIG. 2. This prevents a decrease in image quality in the dividing line between the divided screens. The arrow between (a) and (b) in FIG. 2 indicates that the information (AVCMB) including motion vectors is inherited.

Figure 3:
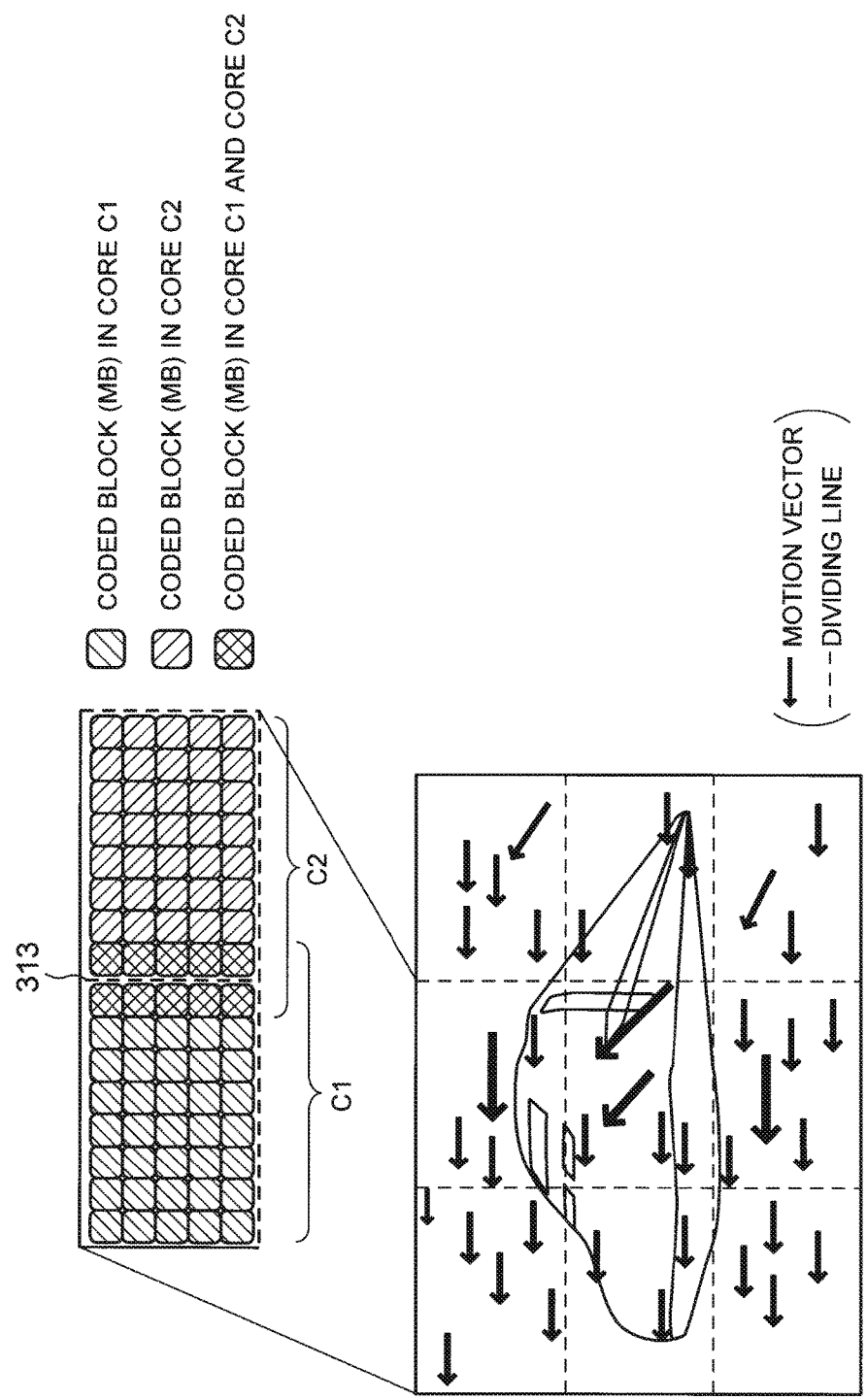
FIG. 3 It is an explanatory diagram depicting an example of blocks encoded in cores.

FIG. 3 is an explanatory diagram depicting an example of blocks encoded in cores. FIG. 3 depicts the relationship between the cores C1 and C2, as an example. Each rectangle in the upper part of FIG. 3 represents a macroblock (MB) which is the coding unit in H.264/AVC (also simply referred to as "AVC"). Each rectangle with first oblique lines (oblique lines from upper left to lower right) represents an MB encoded in the core C1. Each rectangle with second oblique lines (oblique lines from upper right to lower left) represents an MB encoded in the core C2. Each MB on both sides of the dividing line 313 is encoded in both of the cores C1 and C2, as depicted in FIG. 3.

Figure 4:
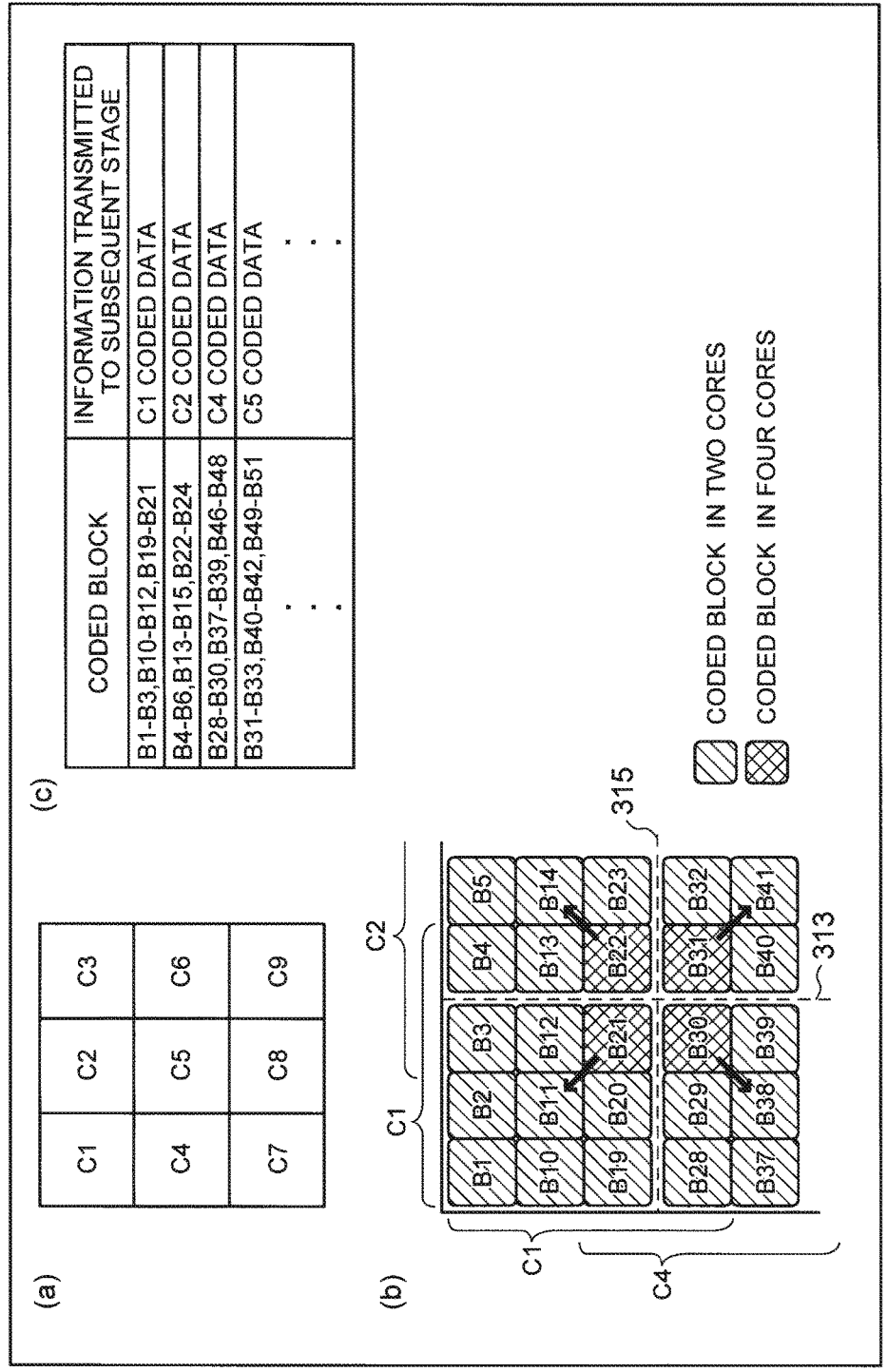
FIG. 4 It is an explanatory diagram depicting an example of overlapping macroblocks.

FIG. 4 is an explanatory diagram depicting an example of overlapping macroblocks. (a) in FIG. 4 depicts an example of the nine cores C1 to C9. (b) in FIG. 4 depicts an example of macroblocks (MBs) B1 to B41 which are the coding unit in H.264/AVC. The MBs (macroblocks B3, B4, B12, B13, B19, B20, B23, B28, B29, B32, B39, and B40 in the example depicted in (b) in FIG. 4) on both sides of each dividing line are each encoded in two cores, as depicted in (b) in FIG. 4. The four MBs (macroblocks B21, B22, B30, and B31 in the example depicted in (b) in FIG. 4) near the intersection of the two dividing lines 313 and 315 are each encoded in four cores. In either case, each MB on both sides of a dividing line is subjected to encoding by a plurality of cores. An MB that is encoded is hereafter also referred to as "coded block". An MB is also simply referred to as "block".

The cores C1 to C9 corresponding to the respective divided screens are provided as depicted in (a) in FIG. 4. As depicted in (b) in FIG. 4, each of the cores C1 to C9 encodes not only the plurality of blocks in the corresponding divided screen, but also the blocks of one row near the dividing line and the blocks of one column near the dividing line in the adjacent divided screens. In other words, each of the cores C1 to C9 also encodes blocks that are included in each nearby divided screen adjacent to the divided screen corresponding to the core with the dividing line in between and are located near the dividing line.

Since some blocks are encoded in a plurality of cores, simply transmitting output data of a plurality of cores to the subsequent stage may cause the situation where a plurality of pieces of coded data are transmitted for one coded block. In view of this, in this exemplary embodiment, control is performed to select, for each coded block handled in a plurality of cores, coded data output from one of the plurality of cores.

(c) in FIG. 4 depicts an example of how to select coded data. The example depicted in (c) in FIG. 4 corresponds to the MBs depicted in (b) in FIG. 4 as an example.

As depicted in (c) in FIG. 4, the output data of the core C1 is selected as the coded data of each of the coded blocks B1 to B3, B10 to B12, and B19 to B21. The output data of the core C2 is selected as the coded data of each of the coded blocks B4 to B6, B13 to B15, and B22 to B24. The output data of the core C4 is selected as the coded data of each of the coded blocks B28 to B30, B37 to B39, and B46 to B48. The output data of the core C5 is selected as the coded data of each of the coded blocks B31 to B33, B40 to B42, and B49 to B51. The coded blocks B6 to B9, B15 to B18, B24 to B27, B33 to B36, and B42 to B51 are omitted in (b) in FIG. 4.

The way of selection as exemplified in (c) in FIG. 4 is hereafter referred to as "selection rule". The selection rule is generalized as follows. For coded data of a block encoded by a single core, the output data of the core is selected. For coded data of a block encoded by a plurality of cores, the output data of the core which targets a block that is located nearest the coded block among blocks surrounding the coded block and is encoded by a single core.

For example, regarding the coded block B19, the blocks B10, B11, B37, and B38 are the blocks that are each encoded by a single core from among the surrounding blocks. Of these blocks, the block B10 or B11 is the block at the nearest position. Accordingly, the output data of the core C1 that encodes the blocks B10 and B11 is selected as the coded data of the coded block B19.

Regarding the coded block B21, the blocks B11, B14, B38, and B41 are the blocks that are each encoded by a single core from among the surrounding blocks. Of these bocks, the block B11 is the block at the nearest position. Accordingly, the output data of the core C1 that encodes the block B11 is selected as the coded data of the coded block B21. In (b) in FIG. 4, the arrows from the blocks B21, B22, B30, and B31 respectively point to the blocks B11, B14, B38, and B41 each as the block satisfying the above-mentioned condition.

Regarding the coded block B39, the blocks B37, B38, and B41 are the blocks that are each encoded by a single core from among the surrounding blocks. Of these blocks, the blocks B37 and B38 are each the block at the nearest position. Accordingly, the output data of the core C4 that encodes the blocks B37 and B38 is selected as the coded data of the coded block B39.

Figure 5:
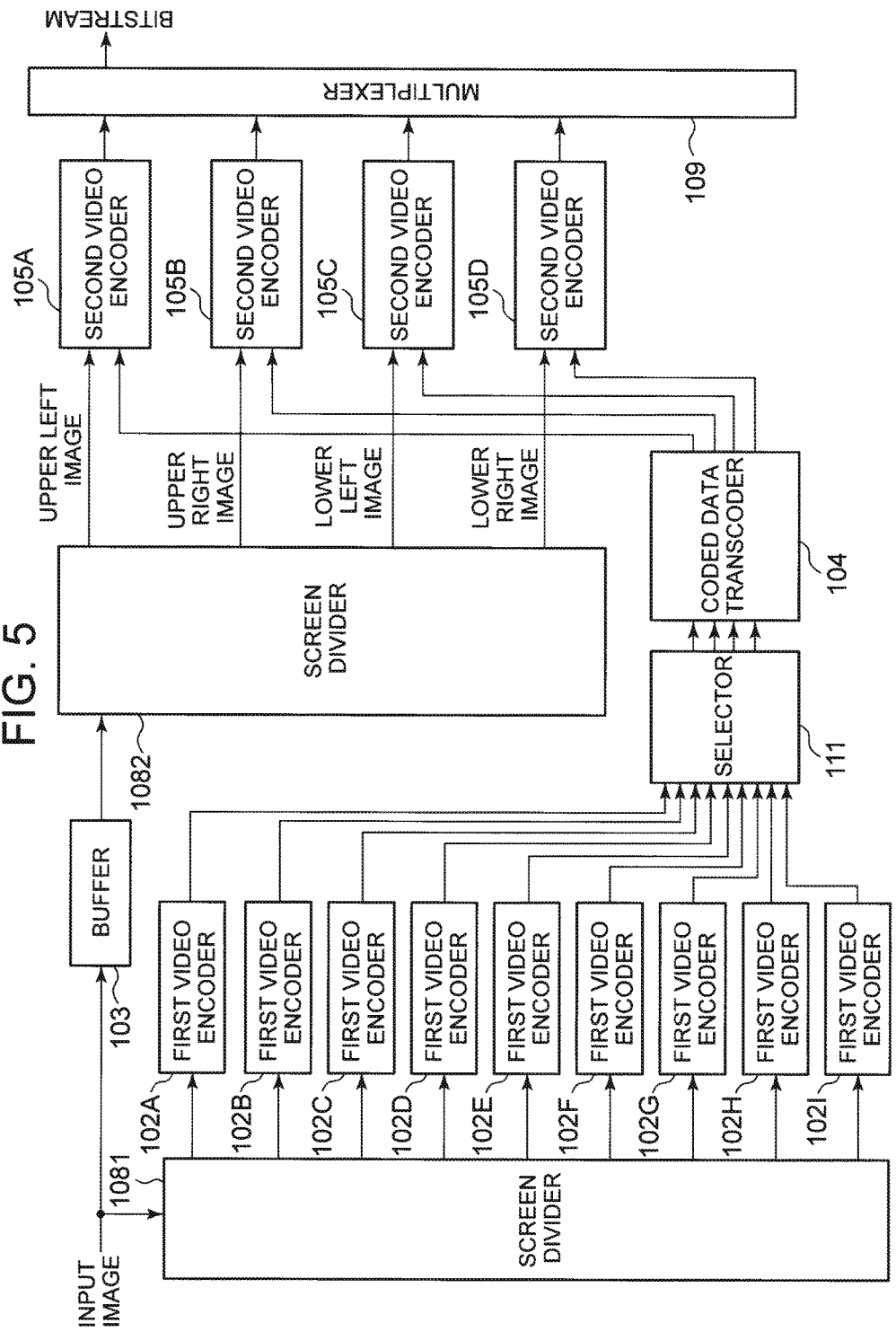
FIG. 5 It is a block diagram depicting a structural example of the video encoding device in the exemplary embodiment.

FIG. 5 is a block diagram depicting a structural example of the video encoding device in this exemplary embodiment. The video encoding device includes: a screen divider 1081 for dividing an input image into a plurality of screens; first video encoders 102A, 102B, 102C, 102D, 102E, 102F, 102G, 102H, and 102I (corresponding to the cores C1 to C9) for encoding the respective divided screens; a buffer 103; a selector 111; a coded data transcoder 104; a screen divider 1082 for dividing an input image supplied from the buffer 103 into four screens; second video encoders 105A, 105B, 105C, and 105D for encoding the respective divided screens; and a multiplexer 109 for multiplexing coded data from the second video encoders 105A, 105B, 105C, and 105D and outputting a bitstream.

Figure 22:
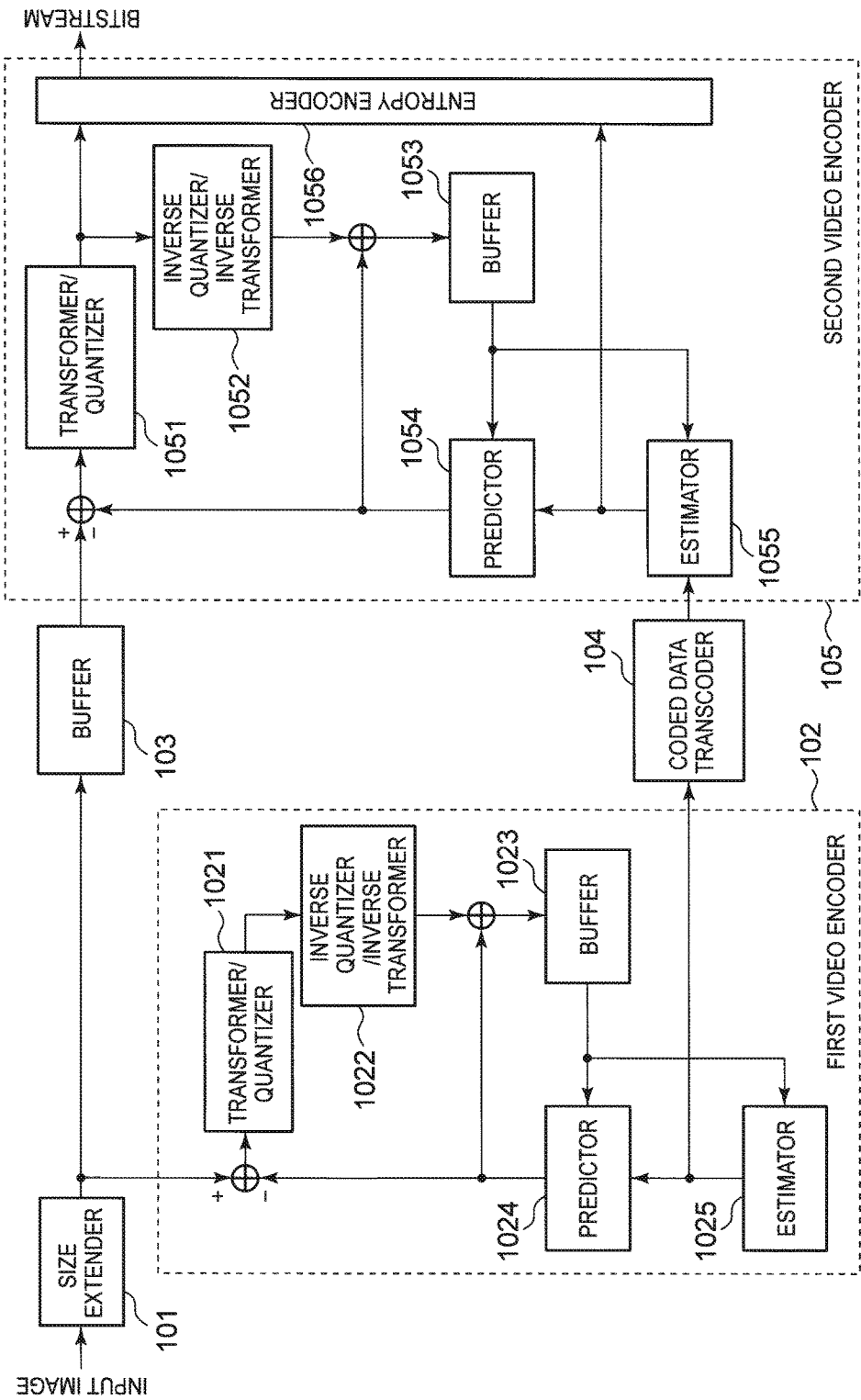
FIG. 22 It is a block diagram depicting a structural example of a video encoding device.
Figures 23, 24:
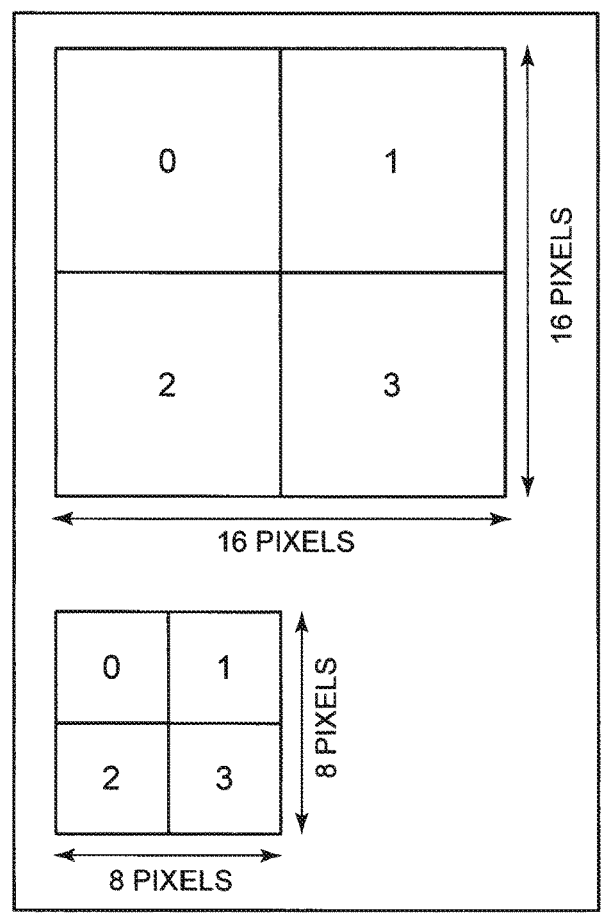
FIG. 23 It is an explanatory diagram depicting AVC coded data.
FIG. 24 It is an explanatory diagram for describing block addresses in a macroblock.
Figure 25:
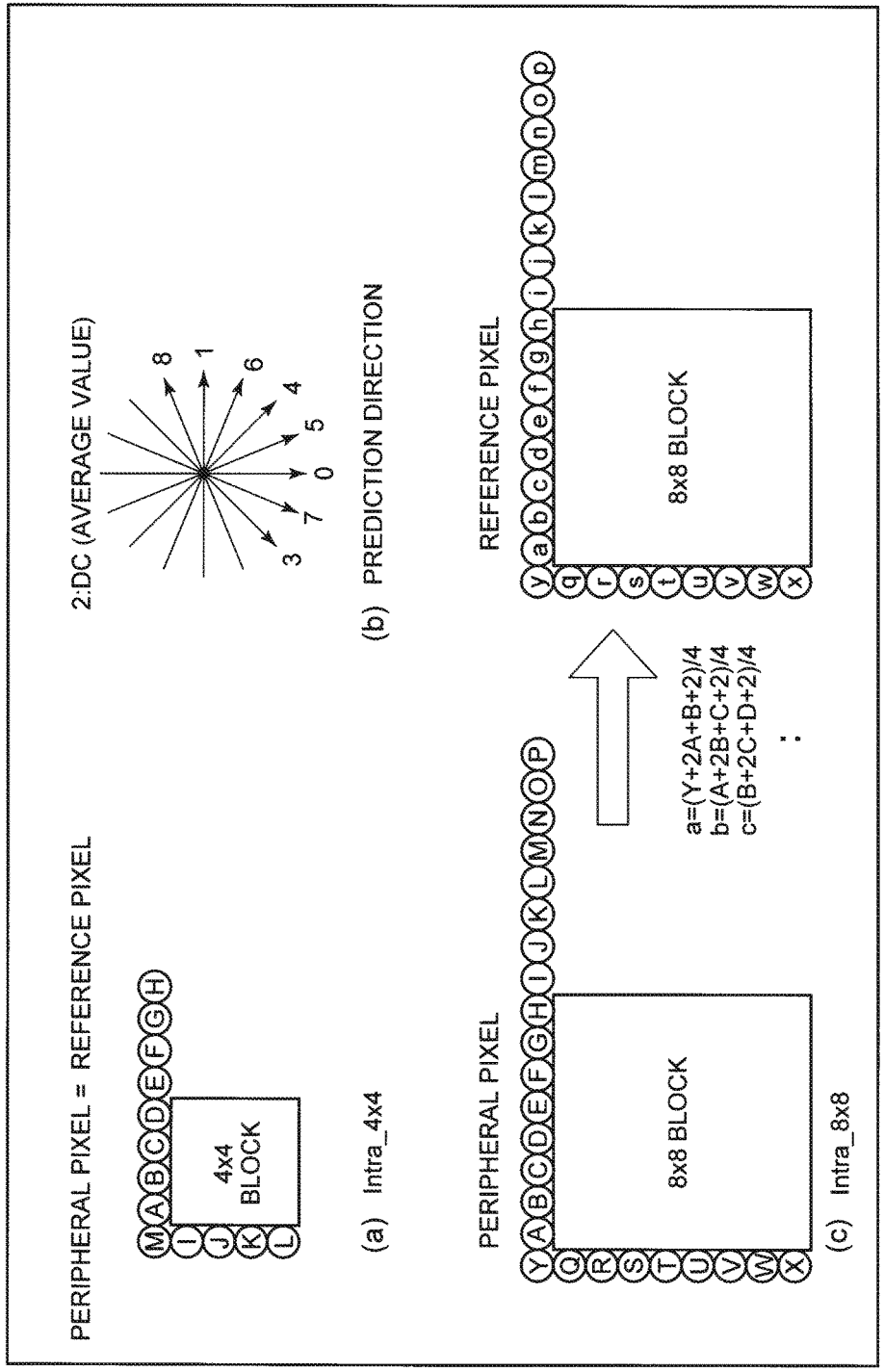
FIG. 25 It is an explanatory diagram for describing prediction types.
Figure 26:
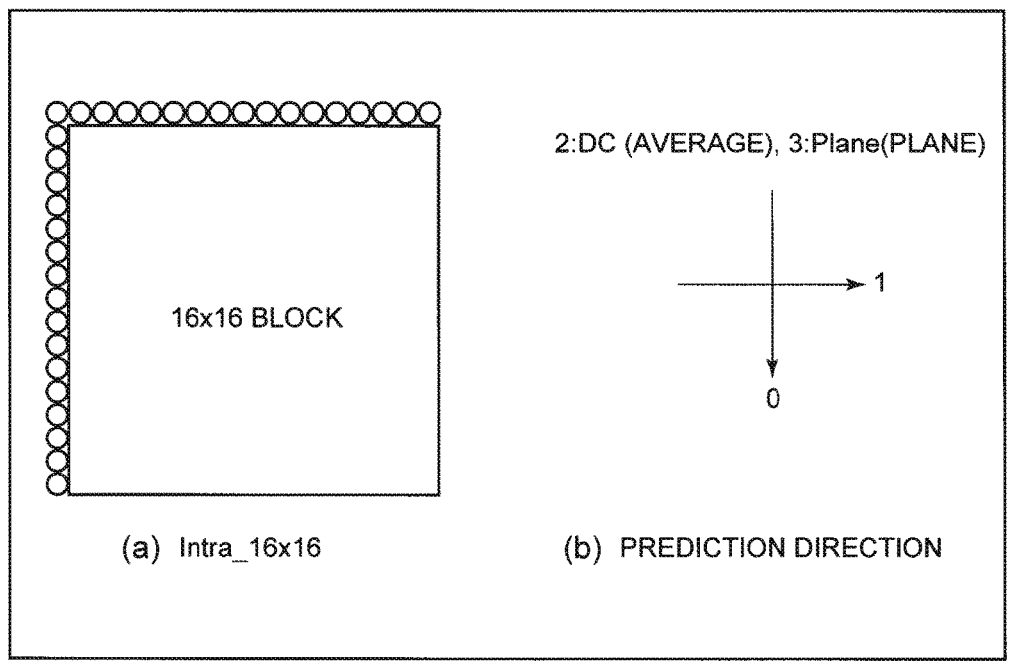
FIG. 26 It is an explanatory diagram for describing prediction types.
Figures 27, 28:
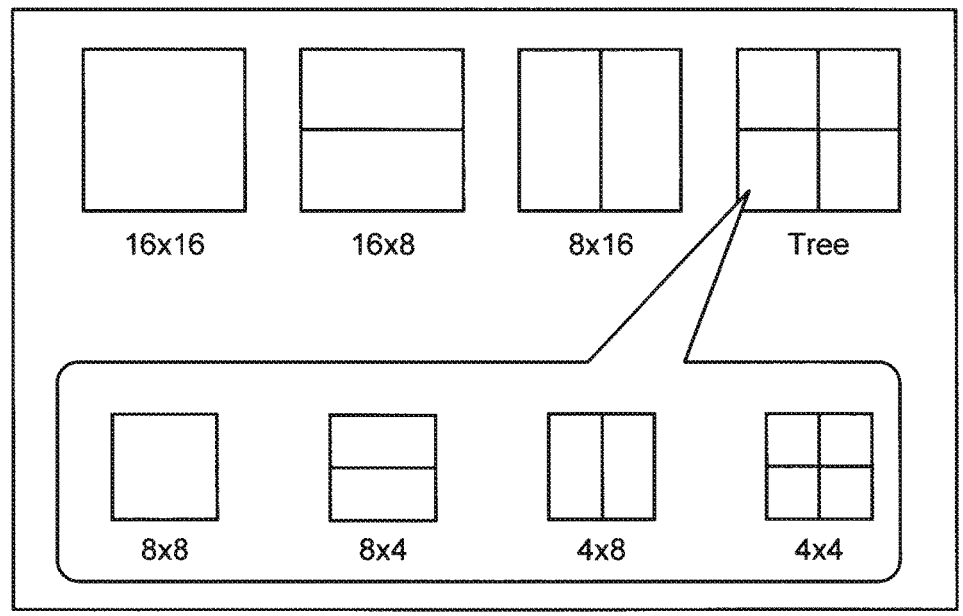
FIG. 27 It is an explanatory diagram depicting prediction shapes of Tree in AVC.
FIG. 28 It is an explanatory diagram depicting an HEVCCB which is HEVC coded data.
Figure 32:
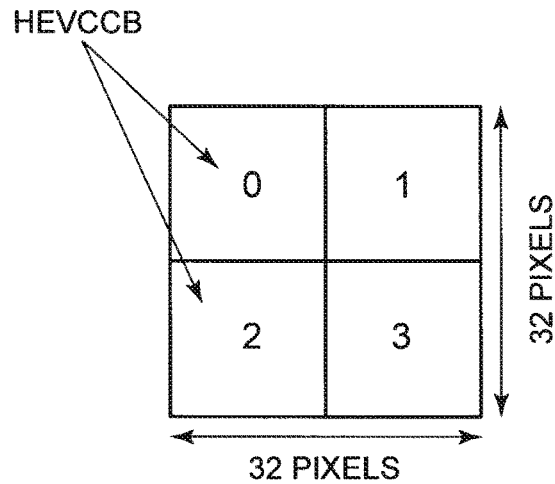
FIG. 32 It is an explanatory diagram depicting an example of HEVCCBs.
Figure 33:
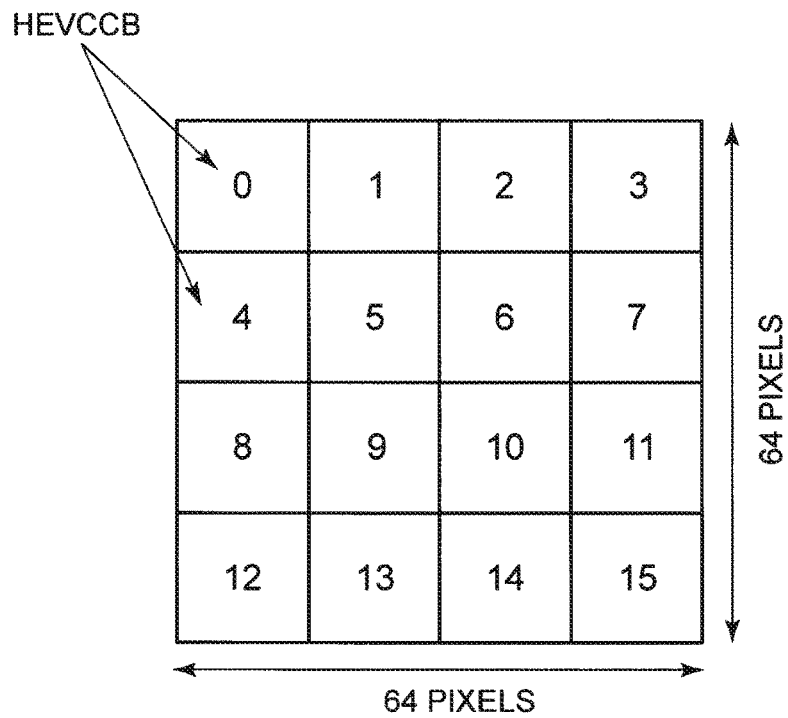
FIG. 33 It is an explanatory diagram depicting an example of HEVCCBs.
Figure 34:
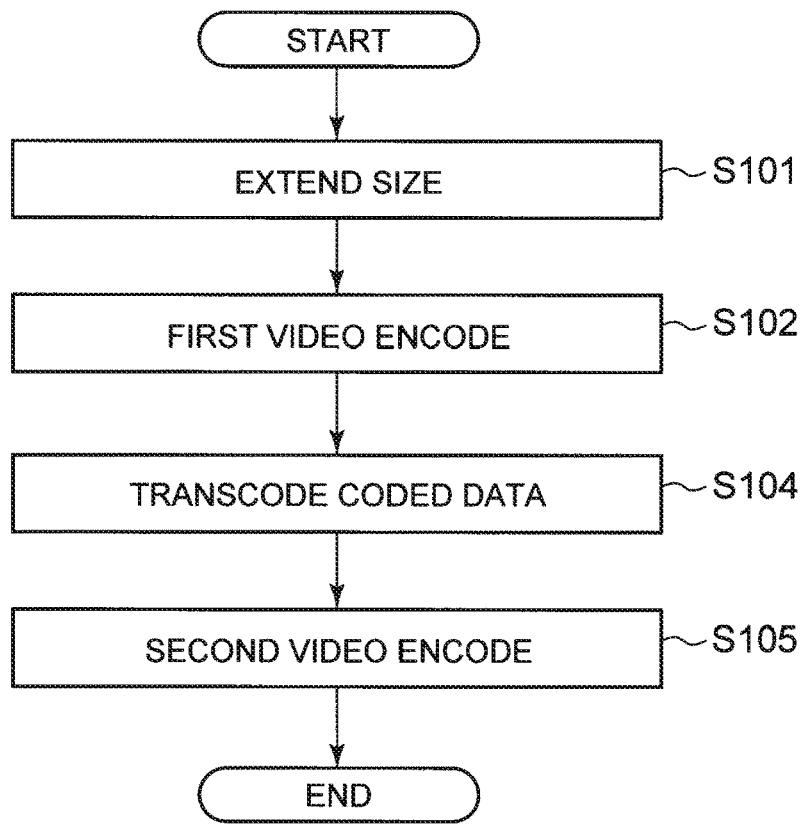
FIG. 34 It is a flowchart depicting the operation of the video encoding device.

The functions of the first video encoders 102A, 102B, 102C, 102D, 102E, 102F, 102G, 102H, and 102I are the same as the function of the first video encoder 102 depicted in FIG. 22. The functions of the second video encoders 105A, 105B, 105C, and 105D are the same as the function of the second video encoder 105 depicted in FIG. 22.

The functions of the buffer 103 and the coded data transcoder 104 are the same as the functions in the video encoding device depicted in FIG. 22. In the video encoding device depicted in FIG. 5, however, the coded data transcoder 104 transcodes coded data output from the nine first video encoders 102A, 102B, 102C, 102D, 102E, 102F, 102G, 102H, and 102I and supplies the transcoded data to the second video encoders 105A, 105B, 105C, and 105D.

The selector 111 selects, for coded data obtained by encoding by a plurality of cores from among coded data output from the first video encoders 102A, 102B, 102C, 102D, 102E, 102F, 102G, 102H, and 102I, output data of one core according to the selection rule. For example, the selection rule as exemplified in (c) in FIG. 4 is stored in the selector 111 in tabular form beforehand.

Figure 6:
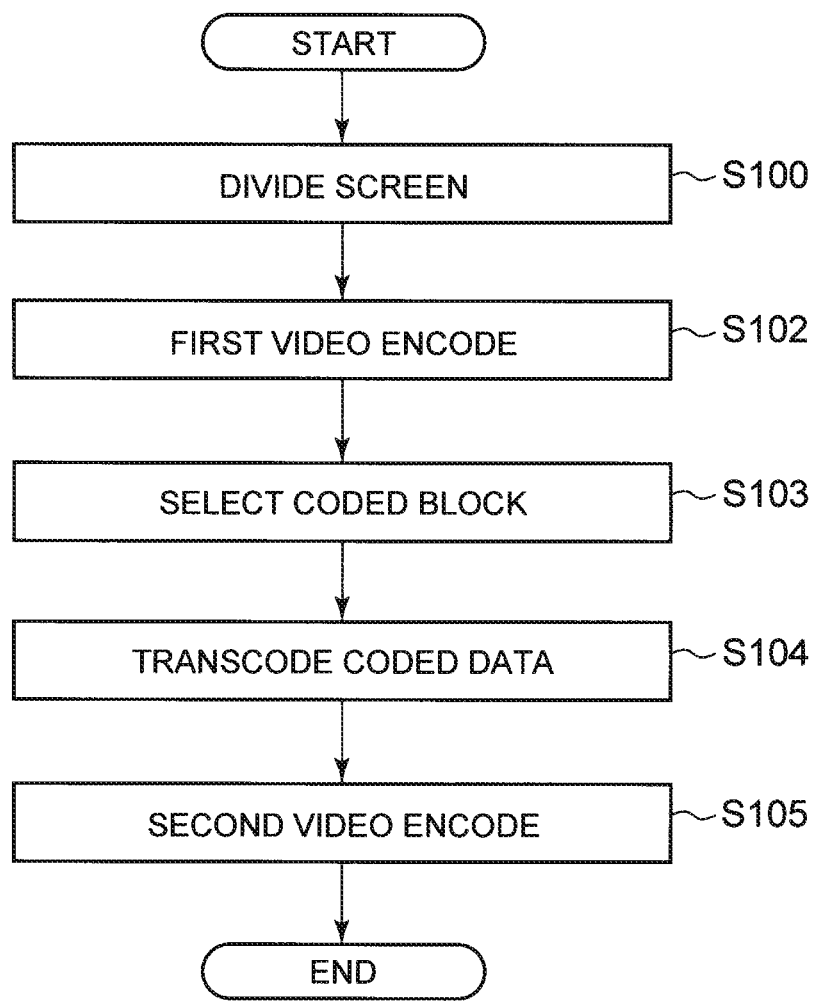
FIG. 6 It is a flowchart depicting the operation of the video encoding device in the exemplary embodiment.

The following describes the operation of the video encoding device in this exemplary embodiment, with reference to a flowchart in FIG. 6.

In step S100, the screen divider 1081 divides the input image into a plurality of divided screens. In detail, the screen divider 1081 divides the input image into N image areas (N is a natural number greater than or equal to 2). In this exemplary embodiment, N=9.

In step S102, the first video encoders 102A, 102B, 102C, 102D, 102E, 102F, 102G, 102H, and 102I encode the images of the divided screens in parallel, according to AVC.

In step S103, the selector 111 selects one of the coded data output from the first video encoders 102A, 102B, 102C, 102D, 102E, 102F, 102G, 102H, and 102I according to the selection rule, and supplies the coded data to the coded data transcoder 104. The selection process by the selector 111 has already been described with reference to (c) in FIG. 4.

In step S104, the coded data transcoder 104 transcodes the AVCMB of each macroblock of the input image output from the selector 111 to the HEVCCB, and further merges HEVC-CBs.

In step S105, the second video encoders 105A, 105B, 105C, and 105D encode, according to HEVC, the input image supplied from the buffer 103 based on the HEVC coded data supplied from the coded data transcoder 104, and outputs a bitstream.

In the video encoding device described above, the load of the video encoding process for determining the split_cu_flag syntax value, the pred_mode_flag syntax value, the part_mode syntax value, the split_tu_flag syntax value, the intra prediction direction, the motion vector, etc. is distributed between the first video encoder and the second video encoder, thus reducing the concentration of the load of the video encoding process.

Moreover, each of the first video encoders 102A, 102B, 102C, 102D, 102E, 102F, 102G, 102H, and 102I (the cores C1 to C9) not only encodes the plurality of blocks constituting the divided screen but also encodes blocks that are included in the nearby divided screens adjacent to the divided screen with the dividing lines in between and are located near the dividing lines, so that motion vectors extending across the dividing lines between the divided screens can be generated. This prevents a decrease in image quality in the dividing lines between the divided screens.

Though the first video encoders 102A, 102B, 102C, 102D, 102E, 102F, 102G, 102H, and 102I are each an AVC video encoder in this exemplary embodiment, the AVC video encoder is an example. The first video encoders 102A, 102B, 102C, 102D, 102E, 102F, 102G, 102H, and 102I may each be an HEVC video encoder supporting 16×16 pixel CTUs. In this case, the coded data transcoder 104 skips the above-mentioned process of transcoding AVC coded data to HEVC coded data.

Though the input image is directly supplied to the screen divider 1081 and the buffer 103 in the foregoing exemplary embodiment as depicted in FIG. 5, the size extender 101 depicted in FIG. 22 may be provided upstream of the screen divider 1081 and the buffer 103.

The size extender 101 size-extends the width src_pic_width and height src_pic_height of an input image src to a multiple of 16, as mentioned earlier. For example, in the case where (src_pic_width, src_pic_height)=(1920, 1080), the extended width e_src_pic_width and height e_src_pic_height of the input image are (e_src_pic_width, e_src_pic_height)=(1920, 1088). A pixel value in a size-extended area may be a copy of a pixel value of a boundary of the input image or a predetermined pixel value (e.g. 128 representing gray).

The size extender 101 supplies the size-extended input image to the screen divider 1081 and the buffer 103.

A pixel bit depth transformer may be provided in addition to the size extender 101. In such a case, the pixel bit depth transformer transforms the 4:2:0 10-bit input image size-extended to a multiple of 16, which is supplied from the size extender 101, to 4:2:0 8-bit. In the bit depth transformation, the 2 LSBs may be dropped by right shift, or subjected to rounding.

The first video encoders 102A, 102B, 102C, 102D, 102E, 102F, 102G, 102H, and 102I each encode the input image (specifically, the divided screen generated by the screen divider 1081) size-extended to a multiple of 16 and transformed to 4:2:0 8-bit, according to AVC.

The coded data transcoder 104 transcodes the AVC coded data of each macroblock of the input image size-extended to a multiple of 16 and transformed to 4:2:0 8-bit, which is supplied from the pixel bit depth transformer, to an HEVCCB.

Though the pixel bit depth transformer reduces the pixel bit depth of the input image size-extended to a multiple of 16 and supplied from the size extender 101, the pixel bit depth transformer may reduce the pixel bit depth of the input image input to the video encoding device. The size extender 101 is omitted in such a case.

The video encoding device may also include a down sampler. The first video encoders 102A, 102B, 102C, 102D, 102E, 102F, 102G, 102H, and 102I are each an AVC video encoder supporting 1080p (2K) input format, and the second video encoders are each an HEVC video encoder. In other words, the spatial resolution that can be supported by the first video encoders 102A, 102B, 102C, 102D, 102E, 102F, 102G, 102H, and 102I is less than the spatial resolution in the second video encoders 105A, 105B, 105C, and 105D.

The down sampler reduces a 2160p input image src (src_pic_width=3840, src_pic_height=2160) to 1080p (src_pic_width=1920, src_pic_height=1080). The down sampler further extends the width src_pic_width and height src_pic_height of the input image reduced to 1080p, to a multiple of 16. A pixel value in an extended area may be a copy of a pixel value of a boundary of the input image reduced to 1080p, or a predetermined pixel value (e.g. 128 representing gray (in the case where the input image is an 8-bit image)).

The first video encoders 102A, 102B, 102C, 102D, 102E, 102F, 102G, 102H, and 102I each encode the input image (specifically, the divided screen generated by the screen divider 1081) reduced to 1080p and extended to a multiple of 16, which is supplied from the down sampler, according to AVC.

The coded data transcoder 104 transcodes the AVC coded data of each macroblock of each of the divided screens constituting the input image reduced to 1080p and extended to a multiple of 16, which is supplied from the down sampler, to an HEVCCB. Here, the coded data transcoder 104 doubles cu_size, tu_size, and the horizontal component value and vertical component value of the motion vector of the motion information, given that the input image to the first video encoders 102 is half in horizontal resolution and vertical resolution with respect to the input image to the second video encoders 105A, 105B, 105C, and 105D.

Next, in the case where part_mode of all adjacent four HEVCCBs are 2N×2N and all of the HEVCCBs have the same cu_size, pred_mode_flag, and motion information (ref_idx_10, ref_idx_11, mv_10, and mv_11), the coded data transcoder 104 merges the four HEVCCBs, as in the foregoing exemplary embodiment. In detail, the coded data transcoder 104 updates cu_size of the four HEVCCBs to 64, given that the input image to the first video encoders 102A, 102B, 102C, 102D, 102E, 102F, 102G, 102H, and 102I is half in horizontal resolution and vertical resolution with respect to the input image to the second video encoders 105A, 105B, 105C, and 105D.

The second video encoders 105A, 105B, 105C, and 105D encode, according to HEVC, the 2160p input image supplied from the buffer 103 based on the HEVC coded data supplied from the first video encoders 102A, 102B, 102C, 102D, 102E, 102F, 102G, 102H, and 102I, and outputs a bitstream, as in the foregoing exemplary embodiment.

In the case where the video encoding device includes the down sampler, the video encoding device can support 2160p (4K) input format of the high definition television (HDTV) standard.

Though an example where the screen divider 1081 divides one screen into four or nine divided screens is described in the foregoing exemplary embodiment, the number of divided screens is not limited to 4 or 9, so long as it is greater than or equal to 2.

Figure 7:
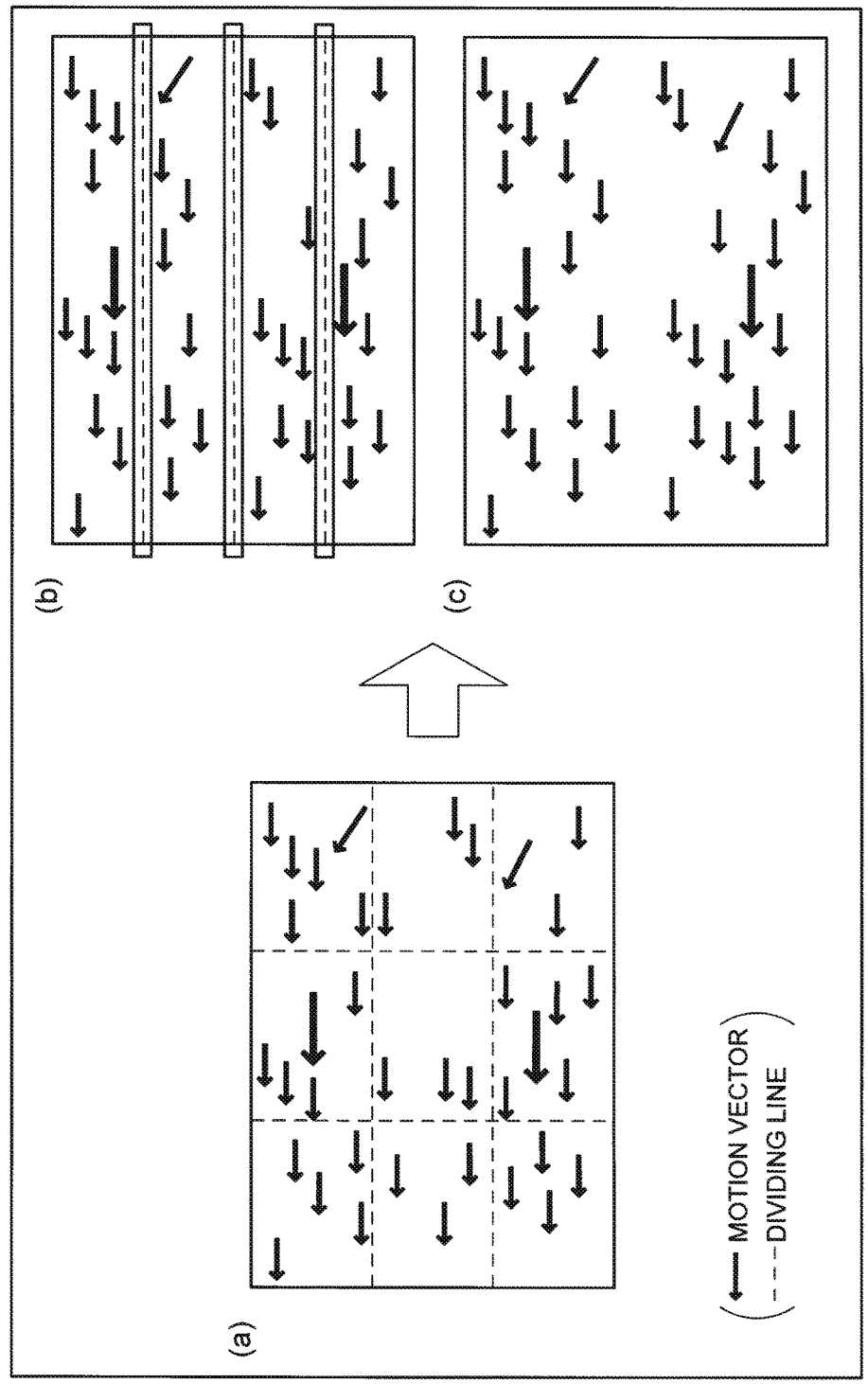
FIG. 7 It is an explanatory diagram depicting an example of screen division in the subsequent stage.

Though an example where the screen divider 1082 divides one screen into four divided screens is described in the foregoing exemplary embodiment, the number of divided screens is not limited to 4. Besides, the division by the screen divider 1081 and the division by the screen divider 1082 may be performed in different ways. As an example, as depicted in (a) and (b) in FIG. 7, the first image divider 1081 divides the screen in the horizontal and vertical directions (see (a) in FIG. 7), whereas the second image divider 1082 performs slice division of dividing the screen in the horizontal direction (see (b) in FIG. 7). Further, the second screen divider 1082 may perform division where the number of tiles=1 (equivalent to the number of slices=1) (see (c) in FIG. 7). The number of tiles=1 is synonymous with no screen division. The arrow between (a) and (b) or (c) in FIG. 7 indicates that the information (AVCMB) including motion vectors is inherited.

Though N first video encoders are provided for N divided screens (N is a natural number greater than or equal to 2) in the foregoing exemplary embodiment, that is, though the divided screens and the first video encoders are in a one-to-one correspondence with each other, a plurality of first video encoders may be provided for one divided screen, and one first video encoder may be provided for a plurality of divided screens.

The video encoding device in the foregoing exemplary embodiment may be realized by hardware or a computer program.

Figure 8:
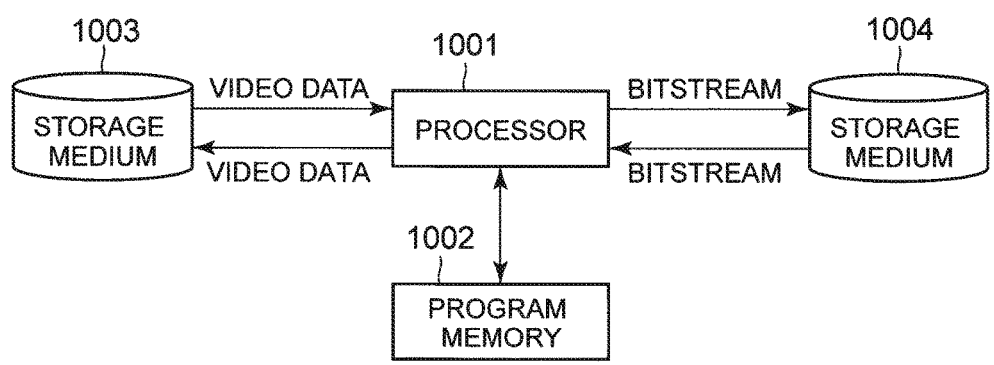
FIG. 8 It is a block diagram depicting a structural example of an information processing system capable of realizing the functions of a video encoding device according to the present invention.

An information processing system depicted in FIG. 8 includes a processor 1001, a program memory 1002, a storage medium 1003 for storing video data, and a storage medium 1004 for storing a bitstream. The storage medium 1003 and the storage medium 1004 may be separate storage media, or storage areas included in the same storage medium. A magnetic storage medium such as a hard disk is available as a storage medium.

In the information processing system depicted in FIG. 8, a program for realizing the functions of the blocks (except the buffer block) depicted in FIG. 5 is stored in the program memory 1002. The processor 1001 realizes the functions of the video encoding device in the foregoing exemplary embodiment, by executing processes according to the program stored in the program memory 1002.

Figure 9:
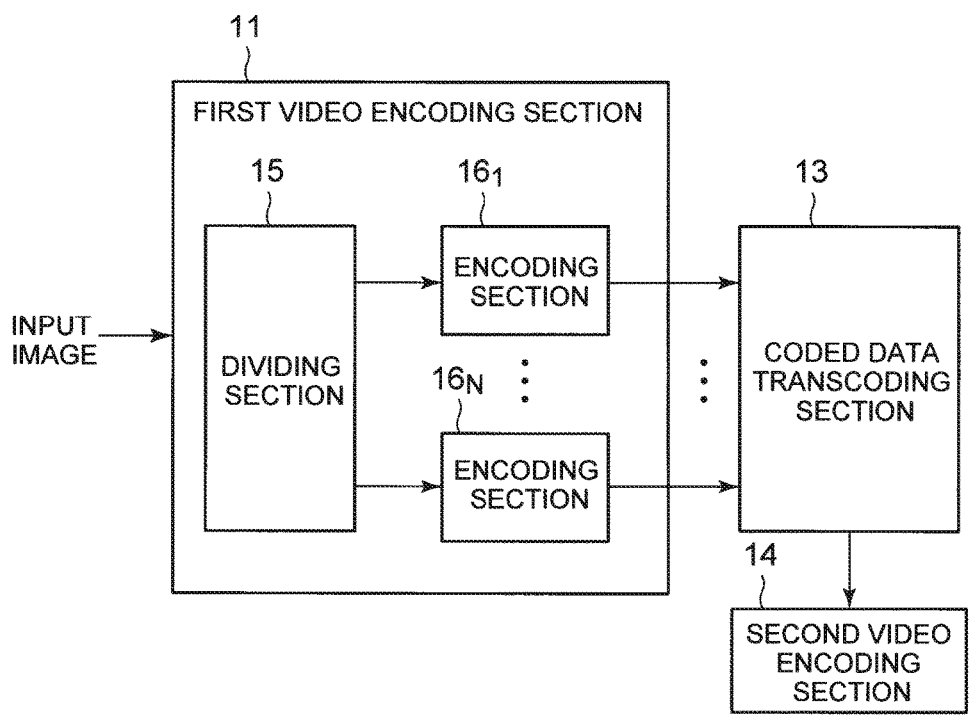
FIG. 9 It is a block diagram depicting main parts of the video encoding device.

FIG. 9 is a block diagram depicting main parts of a video encoding device according to the present invention. As depicted in FIG. 9, the video encoding device includes: a first video encoding section 11 for encoding an input image to generate first coded data; a coded data transcoding section 13 (e.g. the coded data transcoder 104 depicted in FIG. 5) for transcoding the first coded data generated by the first video encoding section 11, to generate second coded data; and a second video encoding section 14 (e.g. the second video encoders 105A, 105B, 105C, and 105D depicted in FIG. 5) for generating a prediction signal based on the second coded data supplied from the coded data transcoding section 13, wherein the first video encoding section 11 includes: a dividing section 15 (e.g. the screen divider 1081 depicted in FIG. 5) for dividing the input image into a plurality of image areas; and at least one encoding section $16_1$ to $16_N$ (e.g. the first video encoders 102A, 102B, 102C, 102D, 102E, 102F, 102G, 102H, and 102I depicted in FIG. 5) corresponding to the image areas each of which is made up of a plurality of blocks, and for performing encoding for the image areas in parallel in units of blocks, and wherein the encoding section $16_1$ to $16_N$ also encodes a block that is included in an image area adjacent with a dividing line in between and is located near the dividing line. In particular, the encoding section $16_1$ to $16_N$ has an inter prediction function of determining a motion vector.

Figure 10:
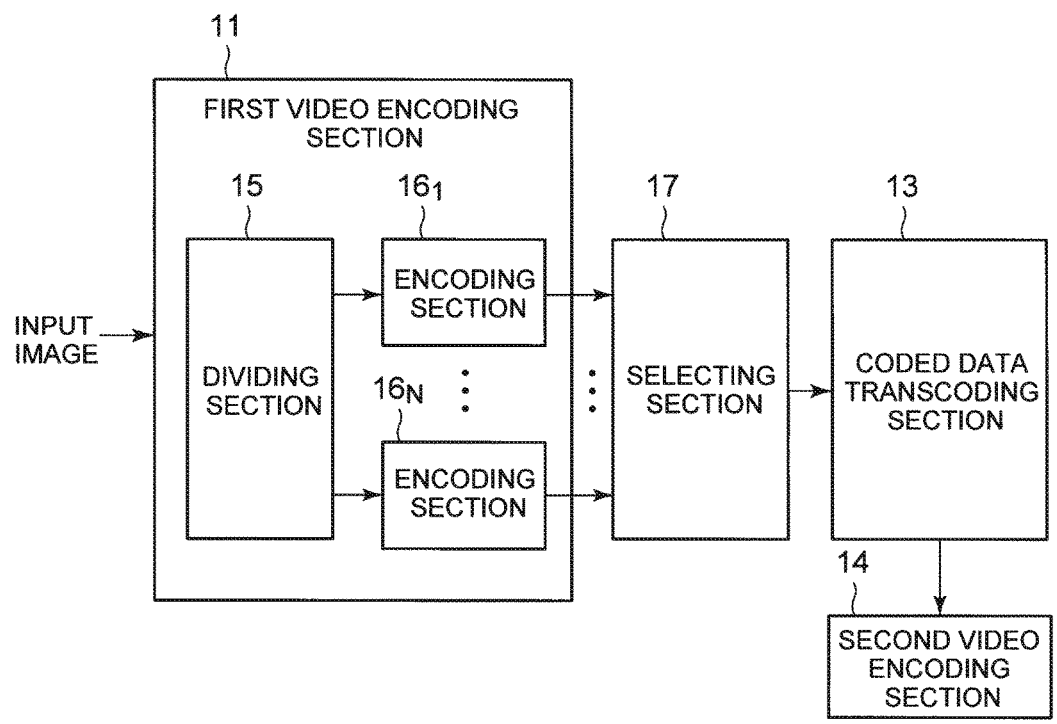
FIG. 10 It is a block diagram depicting another example of the video encoding device.

FIG. 10 is a block diagram depicting main parts of another video encoding device according to the present invention. As depicted in FIG. 10, in addition to the structure of the video encoding device depicted in FIG. 9, the video encoding device further includes a selecting section 17 (e.g. the selector 111 depicted in FIG. 5) for selecting any of coded data generated by a plurality of encoding sections that encode a same block. Preferably, the selecting section 17 selects coded data encoded by single encoding means which encodes a block located nearest the coded block among blocks surrounding the coded block.

Figure 11:
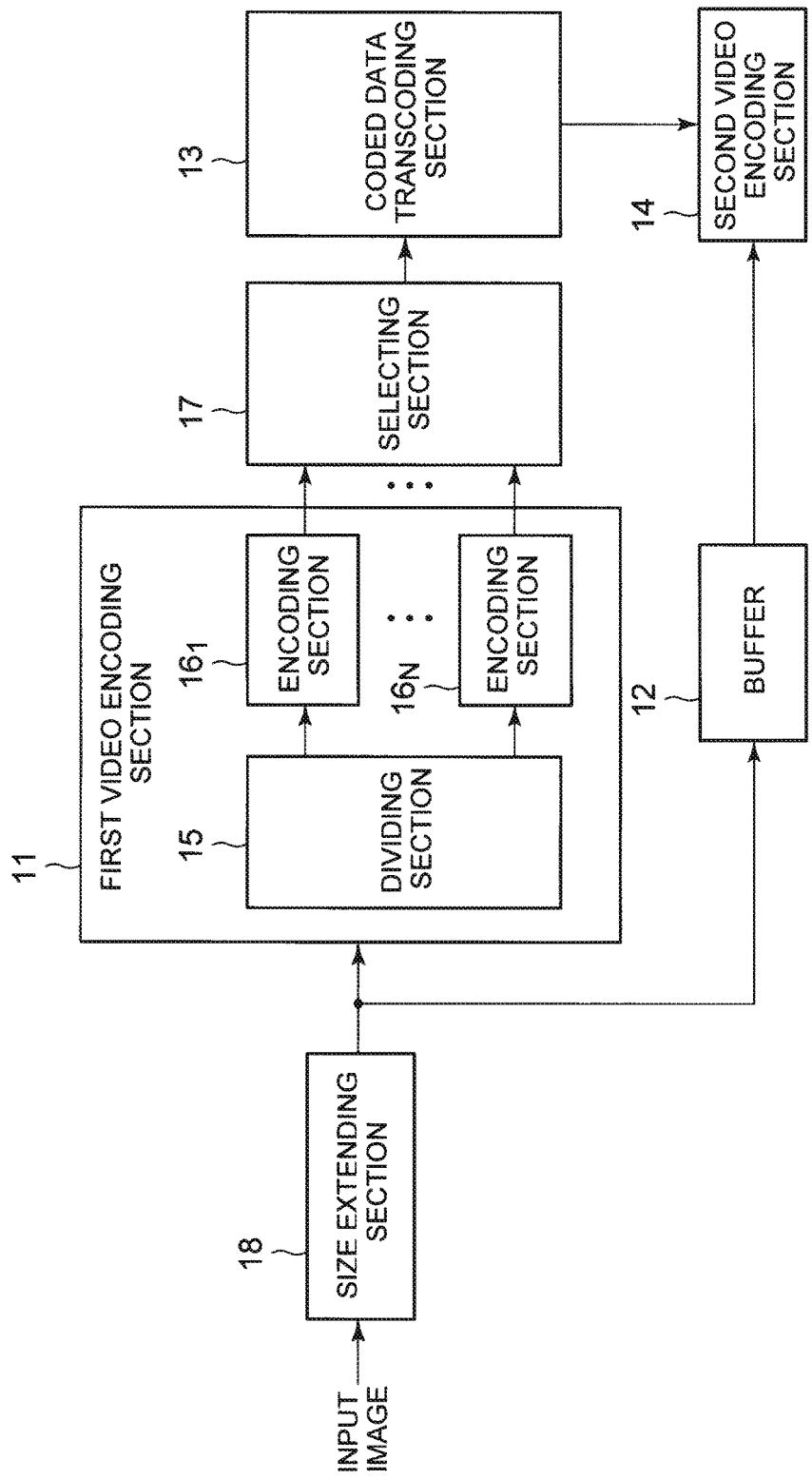
FIG. 11 It is a block diagram depicting another example of the video encoding device.

FIG. 11 is a block diagram depicting main parts of another video encoding device according to the present invention. As depicted in FIG. 11, in addition to the structure of the video encoding device depicted in FIG. 9 or 10, the video encoding device further includes a size extending section 18 for extending a size of the input image to a multiple of a largest CU size supported by the first video encoding section 11, wherein the first video encoding section 11 encodes the input image size-extended by the size extending section 18 to generate the first coded data, and wherein the buffer 12 stores the input image size-extended by the size extending section 18.

Figure 12:
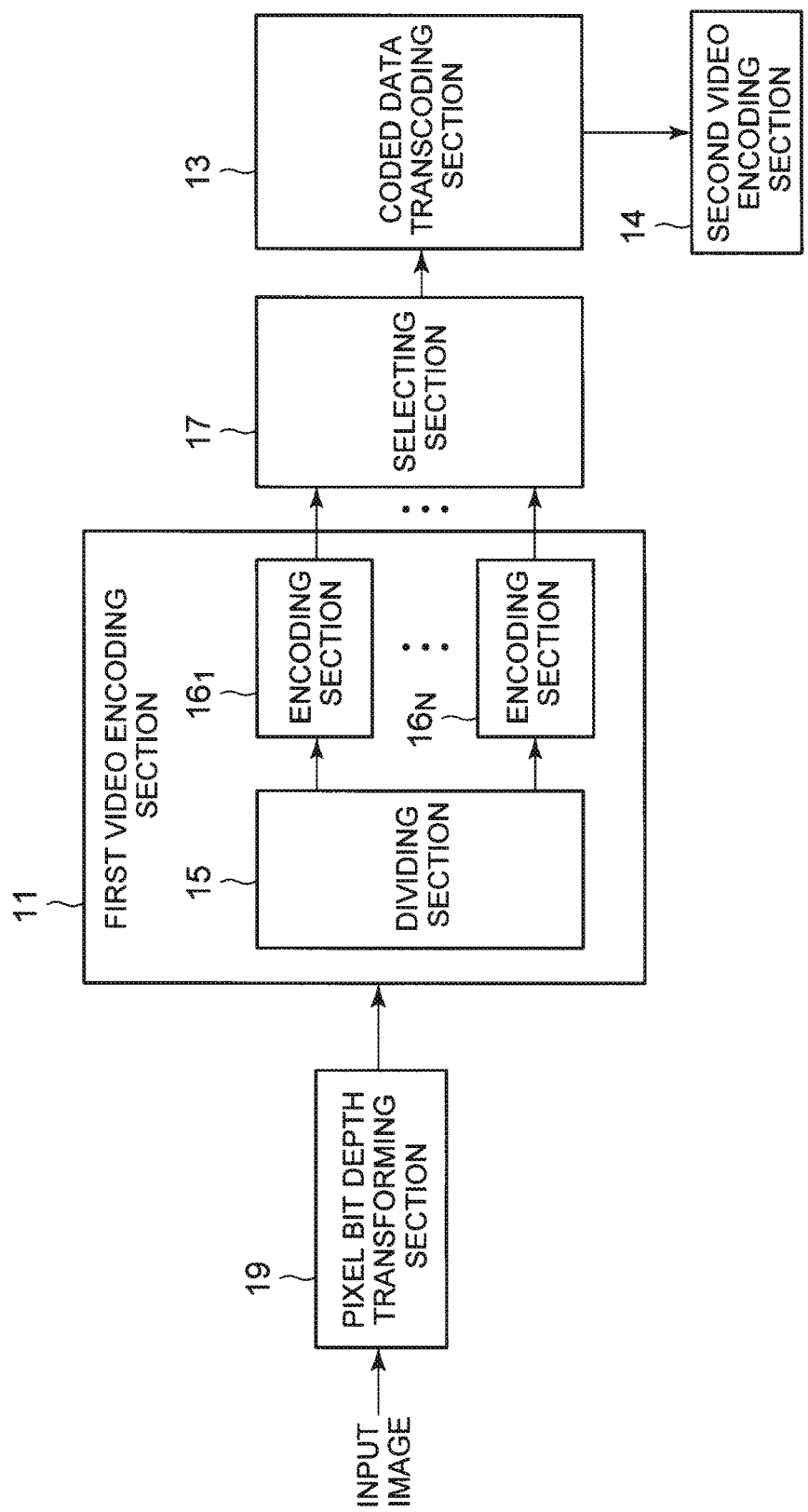
FIG. 12 It is a block diagram depicting another example of the video encoding device.

FIG. 12 is a block diagram depicting main parts of another video encoding device according to the present invention. As depicted in FIG. 12, in addition to the structure of the video encoding device depicted in FIG. 9 or 10, the video encoding device further includes a pixel bit depth transforming section 19 for reducing a pixel bit depth of the input image, wherein the first video encoding section 11 encodes the input image with the pixel bit depth reduced by the pixel bit depth transforming section 19. The pixel bit depth supported by the first video encoding section 11 is less than or equal to the pixel bit depth supported by the second video encoding section 14.

Figure 13:
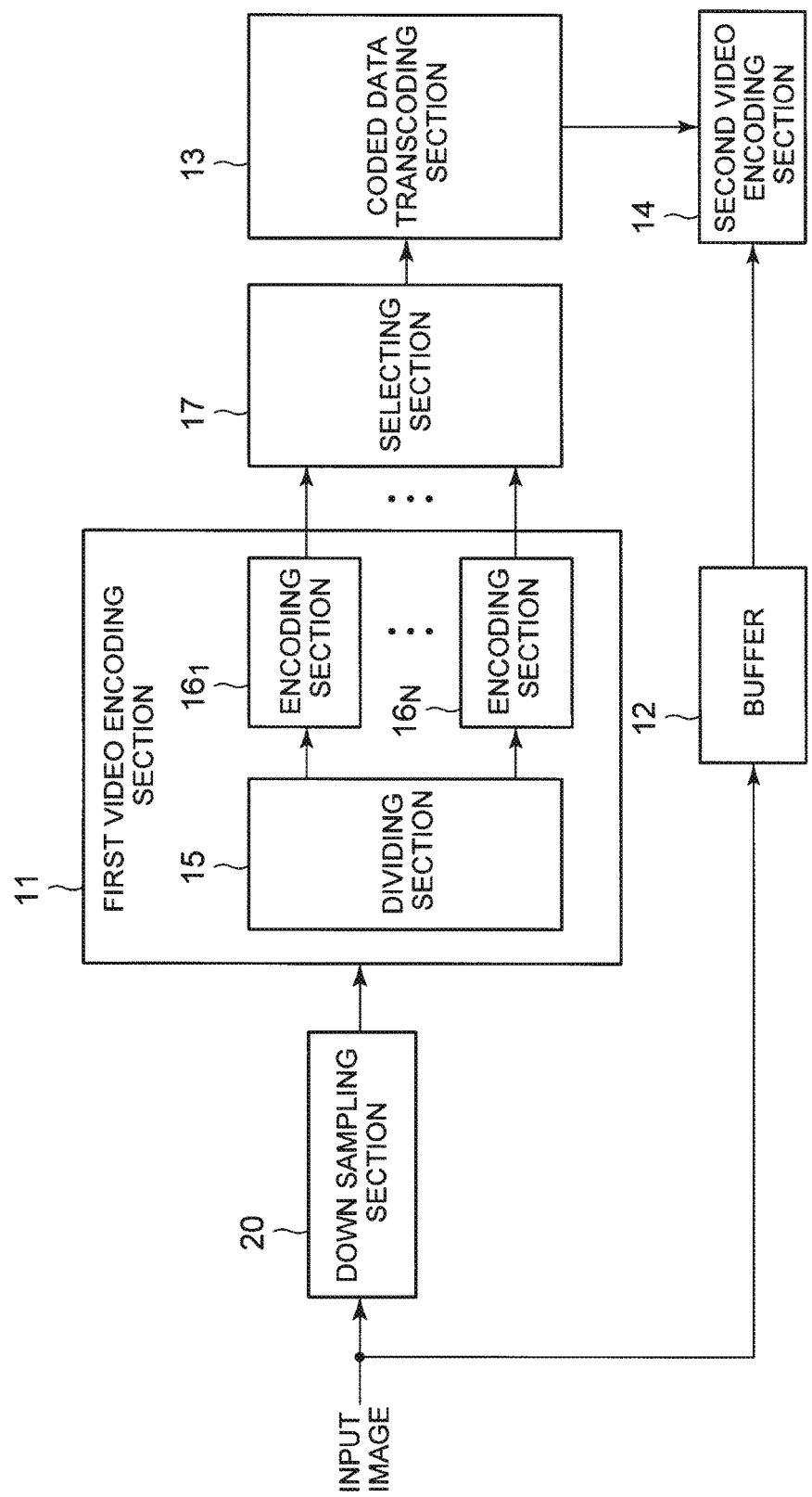
FIG. 13 It is a block diagram depicting another example of the video encoding device.

FIG. 13 is a block diagram depicting main parts of another video encoding device according to the present invention. As depicted in FIG. 13, in addition to the structure of the video encoding device depicted in FIG. 9 or 10, the video encoding device further includes a down sampling section 20 for reducing spatial resolution of the input image, wherein the first video encoding section 11 encodes the input image with the spatial resolution reduced by the down sampling section 20 to generate the first coded data, and wherein the coded data transcoding section 13 generates the second coded data based on a ratio in spatial resolution of video encoded by the first video encoding section 11 and video encoded by the second video encoding section 14.

The video encoding device in the foregoing exemplary embodiment includes: first video encoding means for encoding an input image to generate first coded data; coded data transcoding means for transcoding the first coded data generated by the first video encoding means, to generate second coded data; and second video encoding means for generating a prediction signal based on the second coded data supplied from the coded data transcoding means. The present invention may also be applied to a video encoding device including one video encoding means as described in the following Supplementary note 1 or 2.

(Supplementary note 1) A video encoding device including: dividing means for dividing an input image into a plurality of image areas; and encoding means corresponding to the image areas each of which is made up of a plurality of blocks, and for performing encoding in units of blocks, wherein the encoding means also encodes a block that is included in an image area adjacent with a dividing line in between and is located near the dividing line, wherein the video encoding device further includes selecting means for selecting any of coded data generated by a plurality of encoding means that encode a same block, and wherein the selecting means selects coded data encoded by single encoding means which encodes a block located nearest the coded block among blocks surrounding the coded block.

(Supplementary note 2) A video encoding device including: first dividing means for dividing an input image into a plurality of areas; second dividing means for dividing each of the image areas into a plurality of blocks; encoding means for determining one image area from the plurality of image areas, and transforming blocks in the determined image area and a block that is included in an image area adjacent with a dividing line in between and is located near the dividing line, to coded data in units of blocks; and selecting means for selecting any of coded data by a plurality of encoding means that encode a same block, wherein the encoding means performs encoding on all image areas, and wherein, in the case where a plurality of pieces of coded data are present for the block, the selecting means selects coded data obtained by encoding an image area where the block is present.

Figure 14:
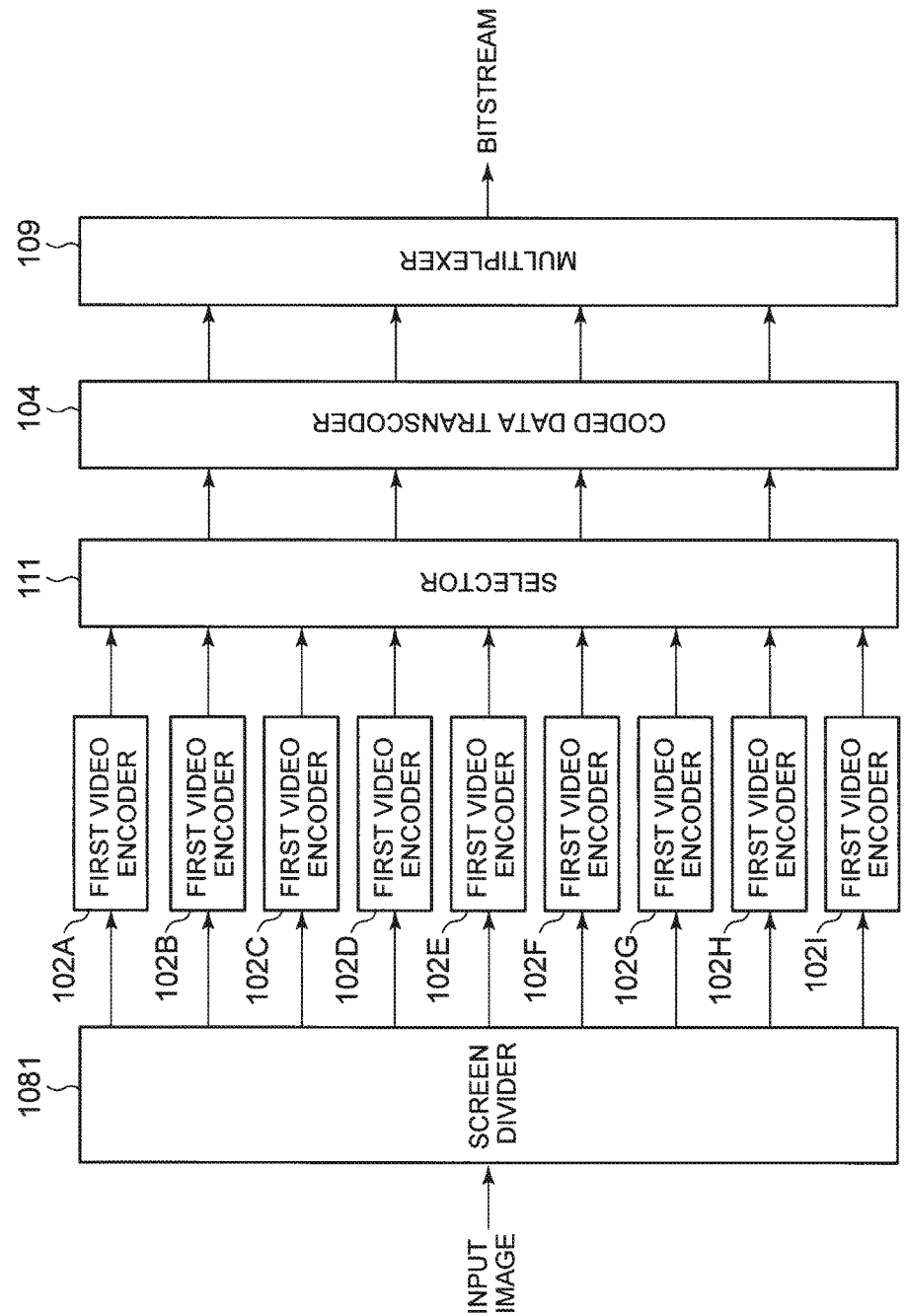
FIG. 14 It is a block diagram depicting an example of the video encoding device.
Figure 15:
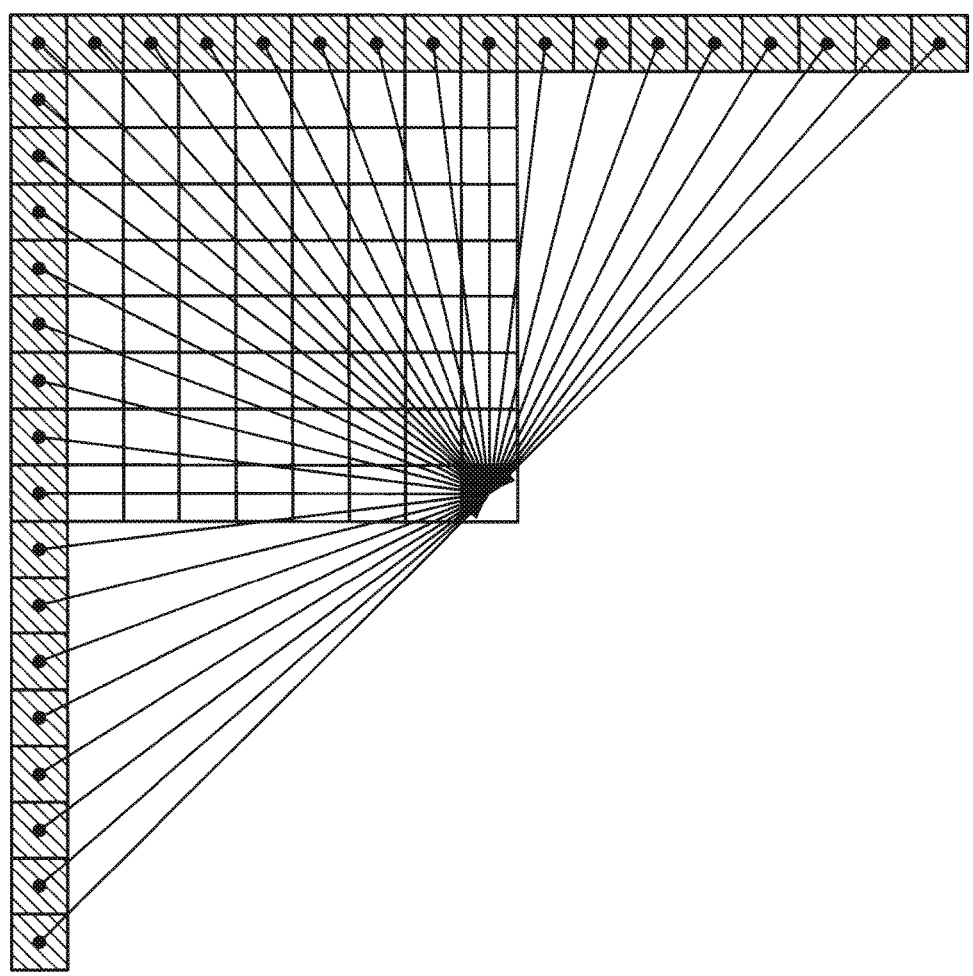
FIG. 15 It is an explanatory diagram depicting an example of 33 types of angular intra prediction.
Figure 16:
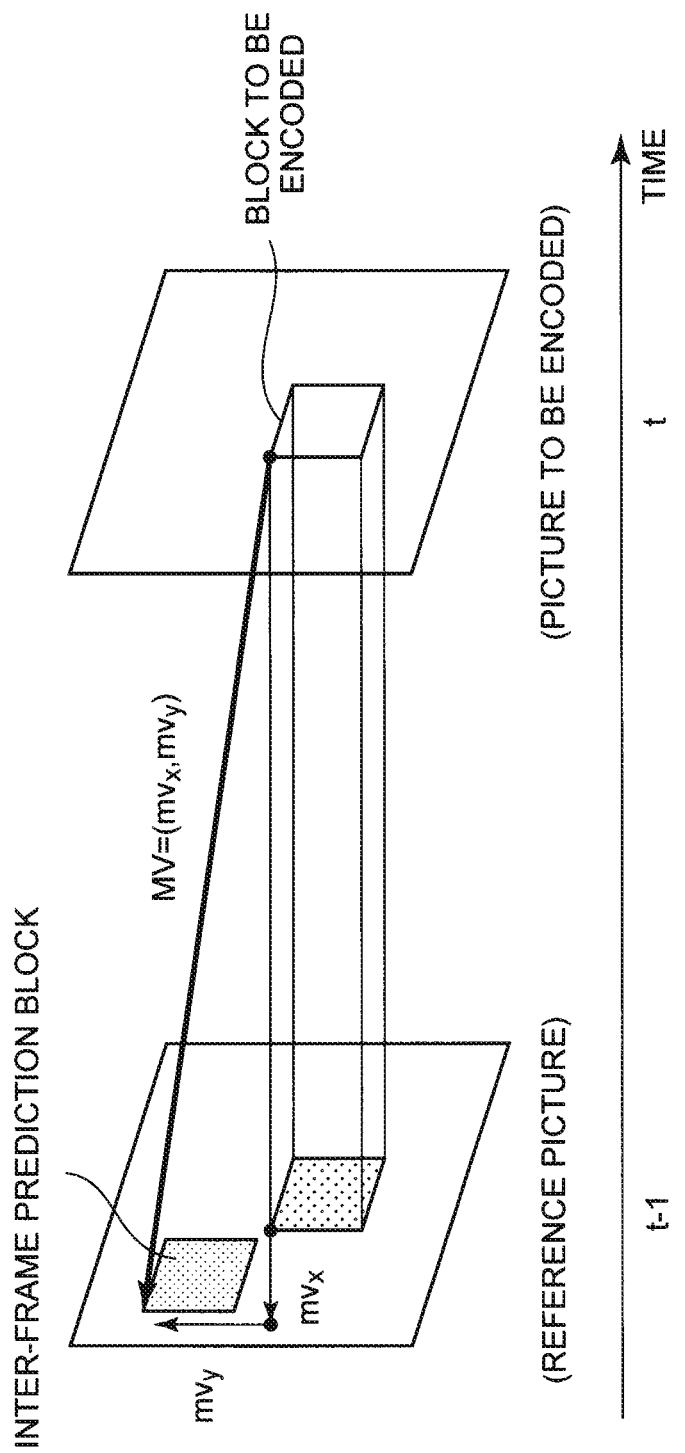
FIG. 16 It is an explanatory diagram depicting an example of inter-frame prediction.
Figure 17:
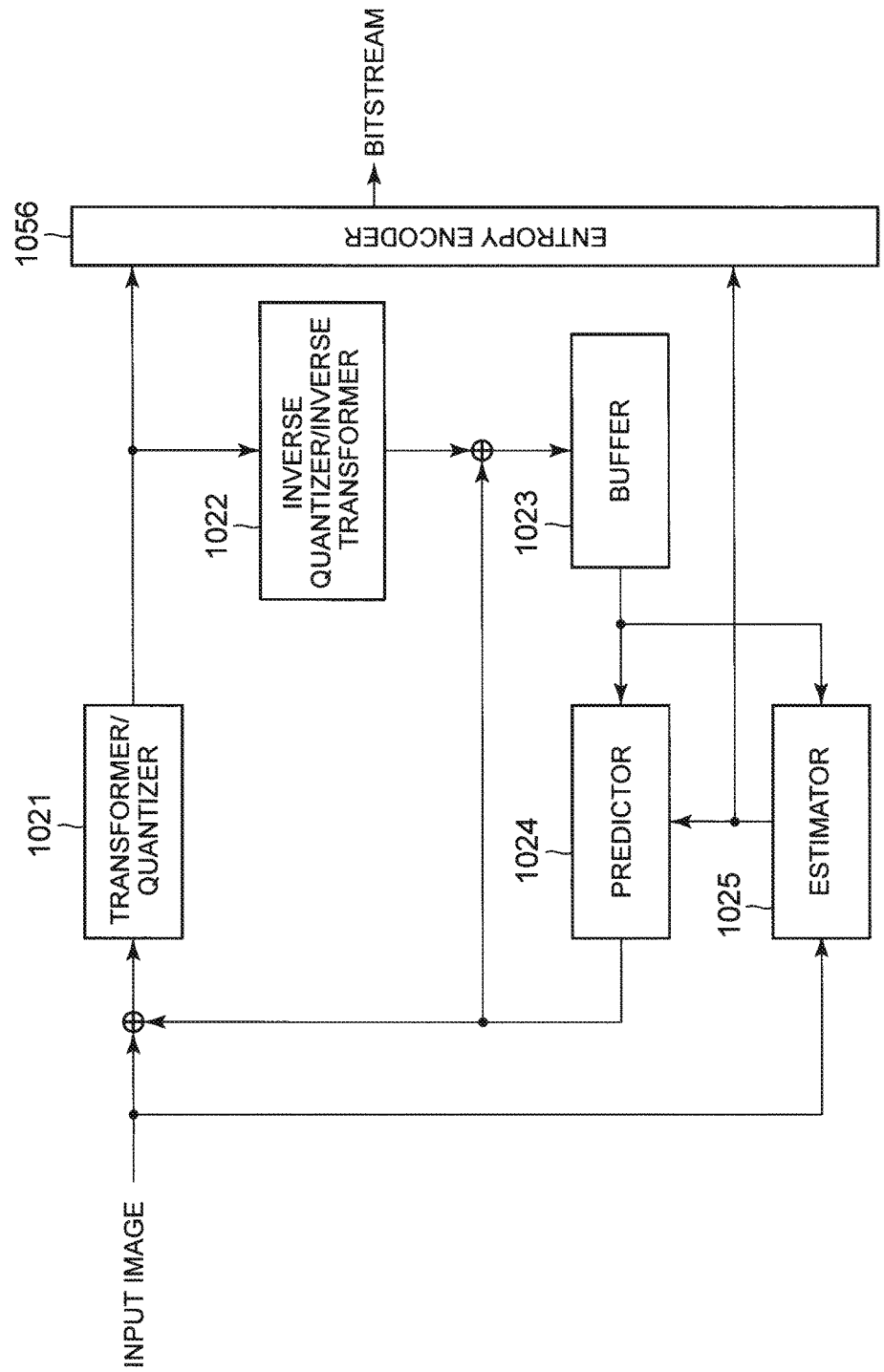
FIG. 17 It is an explanatory diagram depicting the structure of a typical video encoding device.
Figure 18:
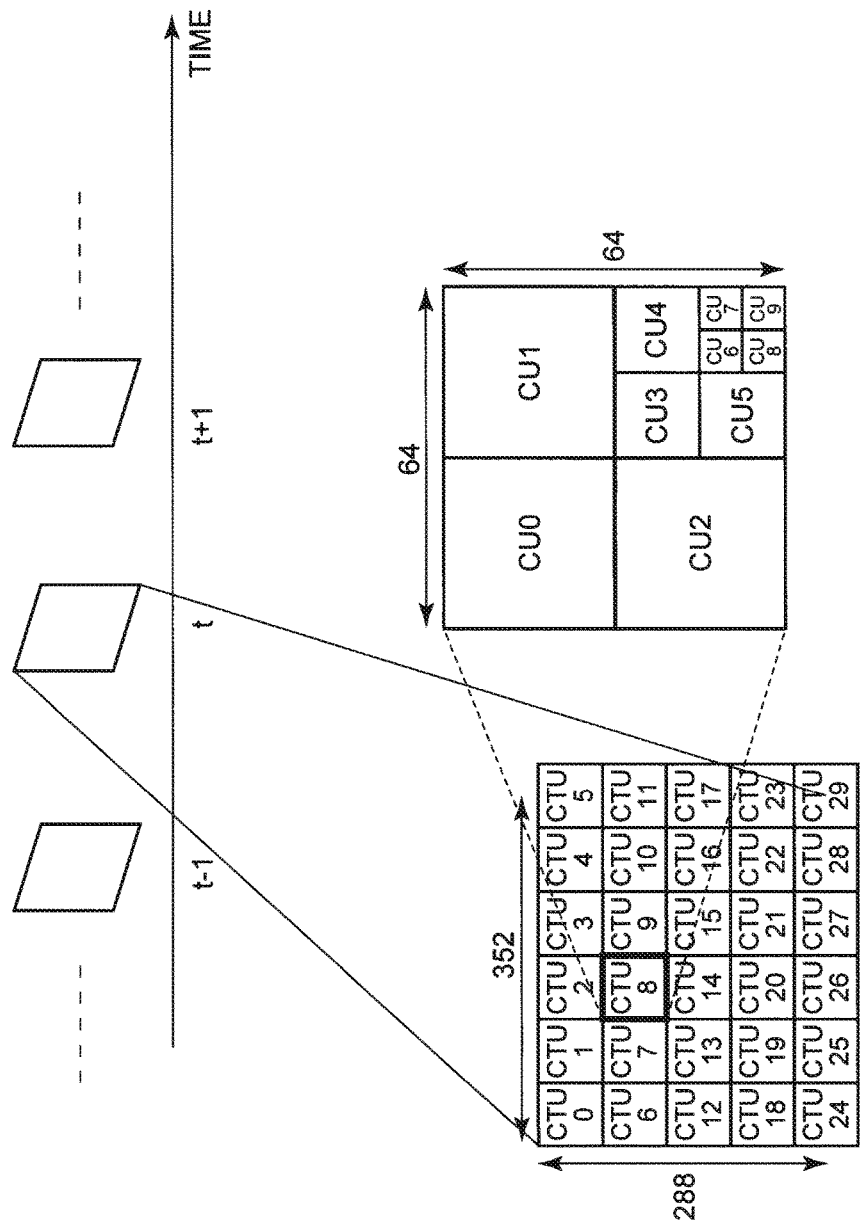
FIG. 18 It is an explanatory diagram depicting an example of CTU partitioning of a frame t and an example of CU partitioning of CTU8 of the frame t.
Figure 19:
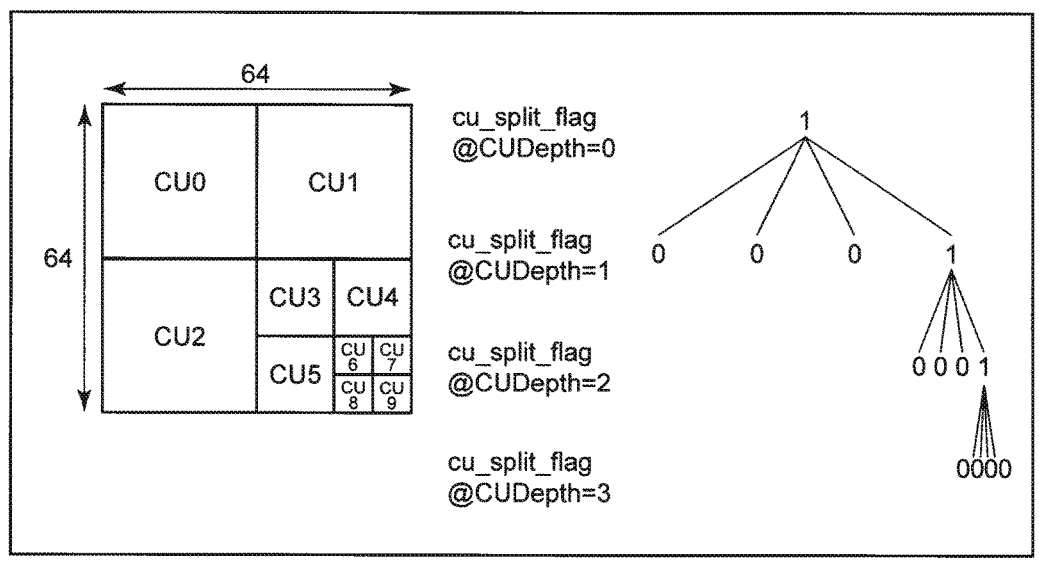
FIG. 19 It is an explanatory diagram depicting a quadtree structure corresponding to the example of CU partitioning of CTU8.
Figure 20:
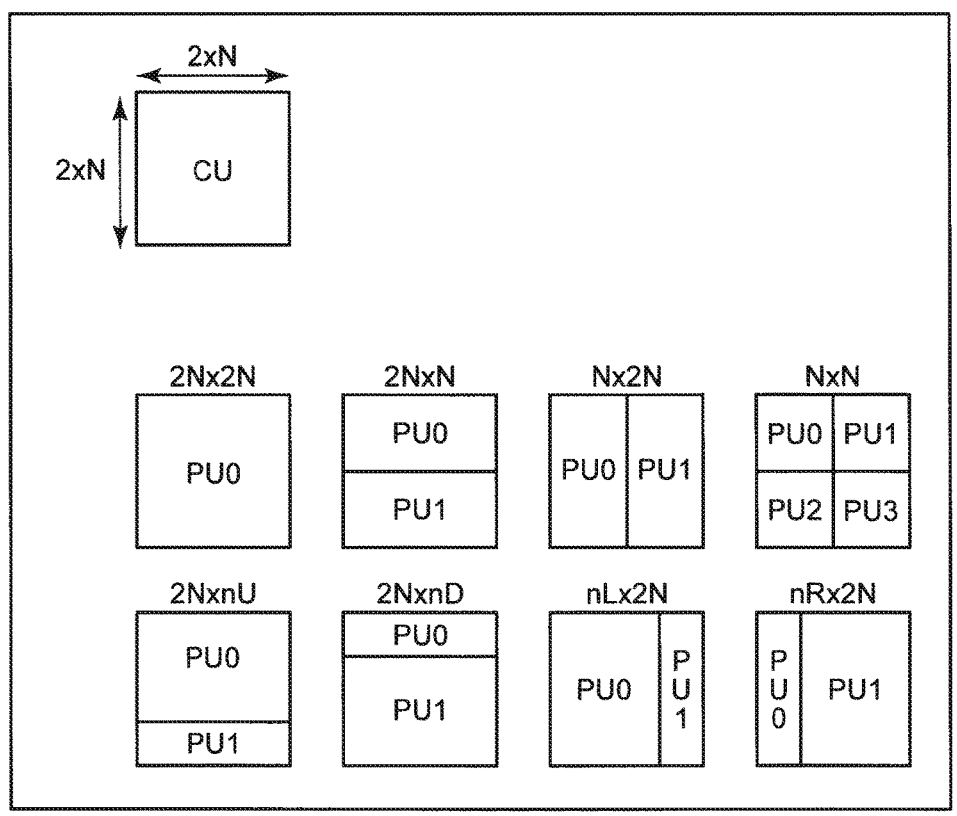
FIG. 20 It is an explanatory diagram depicting examples of PU partitioning of a CU.
Figure 21:
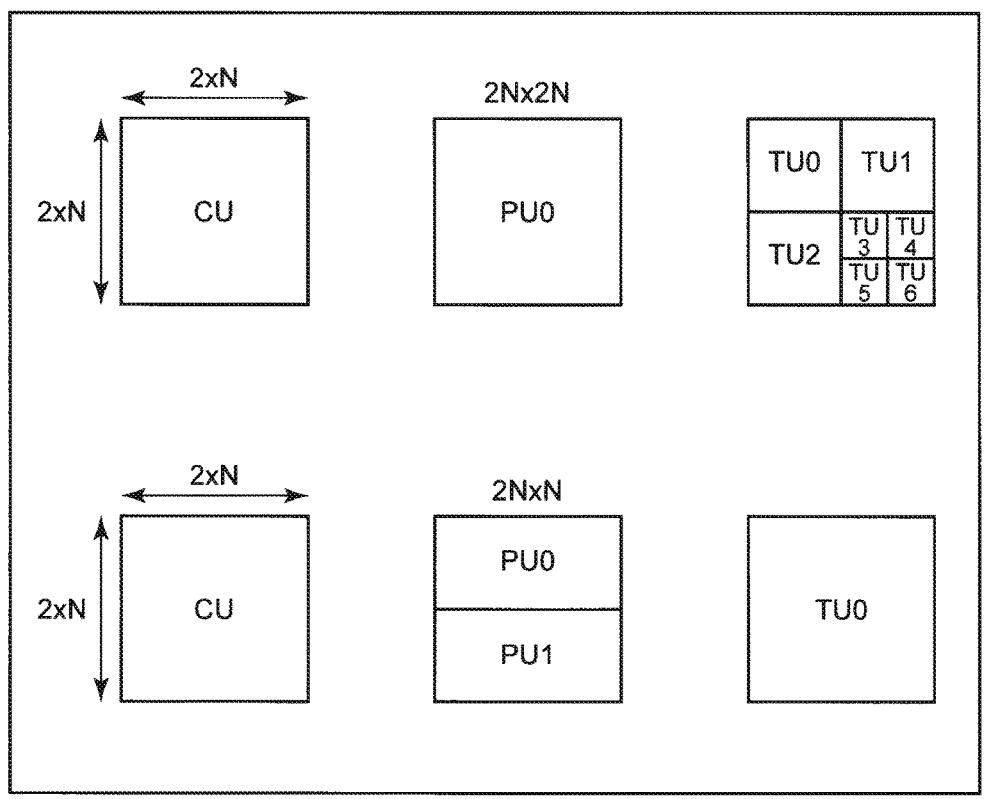
FIG. 21 It is an explanatory diagram depicting examples of TU partitioning of a CU.

FIG. 14 is a block diagram depicting a structural example of the video encoding device described in Supplementary note 1. The video encoding device depicted in FIG. 14 includes: a screen divider 1081 for dividing an input image into a plurality of screens; first video encoders 102A, 102B, 102C, 102D, 102E, 102F, 102G, 102H, and 102I (corresponding to the cores C1 to C9) for encoding the divided screens; a selector 111; a coded data transcoder 104; and a multiplexer 109 for multiplexing coded data from the coded data transcoder 104 and outputting a bitstream. The functions of the components in the video encoding device depicted in FIG. 14 are the same as the functions of the components in the video encoding device depicted in FIG. 5.

The structure depicted in FIG. 14 does not include a screen divider 1082 and second video encoders 105A, 105B, 105C, and 105D for encoding divided screens. Thus, the video encoding device depicted in FIG. 14 is a video encoding device that does not execute a coding process in two stages (first and second) but executes a coding process in one stage. A decrease in image quality in a dividing line of divided screens can be prevented with such a video encoding device, too.

While the present invention has been described with reference to the exemplary embodiments and examples, the present invention is not limited to the aforementioned exemplary embodiments and examples. Various changes understandable to those skilled in the art within the scope of the present invention can be made to the structures and details of the present invention.

This application claims priority based on Japanese Patent Application No. 2014-023089 filed on Feb. 10, 2014, the disclosures of which are incorporated herein in their entirety.

REFERENCE SIGNS LIST

11 first video encoding section
12, 103, 1023, 1053 buffer
13 coded data transcoding section
14 second video encoding section
15 dividing section
16$_1$-16$_N$ encoding section
17 selecting section
18 size extending section
19 pixel bit depth transforming section
20 down sampling section
101 size extender
102 first video encoder
102A, 102B, 102C, 102D, 102E, 102F, 102G, 102H, 102I first video encoder (core)
104 coded data transcoder
105, 105A, 105B, 105C, 105D second video encoder
109 multiplexer
300 screen
301-309 divided screen
310 object
311-316 dividing line
401-404 motion vector
1001 processor
1002 program memory
1003, 1004 storage medium
1021, 1051 transformer/quantizer
1022, 1052 inverse quantizer/inverse transformer
1024, 1054 predictor
1025, 1055 estimator
1056 entropy encoder
1081, 1082 screen divider

What is claimed is:

1. A video encoding device comprising:
    first video encoding section, implemented by a hardware including at least one processor, which encodes an input image to generate first coded data;
    coded data transcoding section, implemented by the at least one processor, which transcodes the first coded data generated by the first video encoding section, to generate second coded data; and
    second video encoding section, implemented by the at least one processor, which generates a prediction signal with regard to the input image based on the second coded data supplied from the coded data transcoding section,
    wherein the first video encoding section comprises:
        dividing section which divides the input image into a plurality of image areas; and
        one or more encoding sections which perform encoding in units of blocks, each encoding corresponding to the image area in which there are a plurality of blocks, and
    wherein the first video encoding section also encodes blocks that are included in image areas adjacent to the image area for which the encoding section performs encoding, together with the blocks in the image area for which the encoding section performs encoding.

2. The video encoding device according to claim 1, wherein the first video encoding section has an inter prediction function of determining a motion vector.

3. The video encoding device according to claim 1, further comprising
    selecting section, implemented by the at least one processor, which selects any of coded data encoded by a plurality of encoding section that encode a same block.

4. The video encoding device according to claim 3, wherein the selecting section selects coded data encoded by single encoding section which encodes a block located nearest the coded block among blocks surrounding the coded block.

5. The video encoding device according to claim 2, further comprising
    selecting section which selects any of coded data encoded by a plurality of encoding section that encode a same block.

6. The video encoding device according to claim 5, wherein the selecting section selects coded data encoded by single encoding section which encodes a block located nearest the coded block among blocks surrounding the coded block.

7. A video encoding method comprising:
    encoding an input image to generate first coded data;
    transcoding the first coded data to generate second coded data; and
    generating a prediction signal with regard to the input image based on the second coded data, wherein when generating the first coded data, the input image is divided into a plurality of image areas, and an encoding process is performed in units of blocks for each of the image areas each of which is made up of a plurality of blocks, and wherein when performing the encoding process for each of the image areas, blocks that are included in image areas adjacent to the image area for which the encoding process is performed, are encoded, together with the blocks in the image area for which the encoding process is performed.

8. The video encoding method according to claim 7, wherein inter prediction of determining a motion vector is performed in the encoding process.

9. The video encoding method according to claim 7, wherein any of coded data encoded in a plurality of encoding processes that encode a same block is selected.

10. The video encoding method according to claim 9, wherein coded data encoded by single encoding process which encodes a block located nearest the coded block among blocks surrounding the coded block is selected.

11. The video encoding method according to claim 8, wherein any of coded data encoded in a plurality of encoding processes that encode a same block is selected.

12. The video encoding method according to claim 11, wherein coded data encoded by single encoding process which encodes a block located nearest the coded block among blocks surrounding the coded block is selected.

13. A non-transitory computer readable information recording medium storing a video encoding program when executed by a processor, performs:

encoding an input image to generate first coded data;

transcoding the first coded data to generate second coded data; and generating a prediction signal with regard to the input image based on the second coded data, wherein when generating the first coded data, dividing the input image into a plurality of image areas; and performing encoding in units of blocks, for each of the image areas each of which is made up of a plurality of blocks, and wherein when performing the encoding process for each of the image areas, blocks, that are included in image areas adjacent to the image area for which the encoding process is performed, are encoded, together with the image area for which the encoding process is performed.

14. The non-transitory computer readable information recording medium according to claim 13, executing inter prediction of determining a motion vector in the encoding process.

15. The non-transitory computer readable information recording medium according to claim 13, selecting any of coded data encoded in a plurality of encoding processes that encode a same block.

16. The non-transitory computer readable information recording medium according to claim 15, selecting coded data encoded by single encoding process which encodes a block located nearest the coded block among blocks surrounding the coded block.

* * * * *